US008620108B2

(12) United States Patent  
Saito

(10) Patent No.: US 8,620,108 B2  
(45) Date of Patent: Dec. 31, 2013

(54) IMAGE DATA PROCESSING DEVICE, IMAGE DATA PROCESSING METHOD, AND IMAGE DATA PROCESSING PROGRAM

(75) Inventor: Natsumi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1417 days.

(21) Appl. No.: 11/578,986

(22) PCT Filed: May 19, 2005

(86) PCT No.: PCT/JP2005/009581  
§ 371 (c)(1),  
(2), (4) Date: Oct. 19, 2006

(87) PCT Pub. No.: WO2005/111983  
PCT Pub. Date: Nov. 24, 2005

(65) Prior Publication Data  
US 2007/0253641 A1 Nov. 1, 2007

(30) Foreign Application Priority Data

May 19, 2004 (JP) ................................. 2004-149496

(51) Int. Cl.  
*G06K 9/32* (2006.01)

(52) U.S. Cl.  
USPC .......................................... 382/299; 382/298

(58) Field of Classification Search  
USPC ........................................................ 382/299  
See application file for complete search history.

(56) References Cited

U.S. PATENT DOCUMENTS

| 6,792,007 | B1 * | 9/2004 | Hamada et al. ............... 370/542 |
| 8,352,856 | B2 * | 1/2013 | Fillion et al. .................. 715/243 |
| 2002/0150300 | A1 * | 10/2002 | Lee et al. ....................... 382/229 |
| 2004/0125982 | A1 * | 7/2004 | Kacker et al. ................. 382/100 |
| 2007/0140593 | A1 * | 6/2007 | Wang ............................. 382/298 |

FOREIGN PATENT DOCUMENTS

| JP | 2000-36850 | 2/2000 |
| JP | 2004-110773 | 4/2004 |
| JP | 2004 110773 | 4/2004 |
| JP | 2005-208694 | 8/2005 |
| WO | 03 098445 | 11/2003 |

OTHER PUBLICATIONS

Ferraiolo et al, Scalable Vector Graphics (SVG) 1.1 Specification, W3C Recommendation Jan. 14, 2003.*  
Anuj Maheshwari et al, TransSquid: Transcoding and Caching Proxy for Heterogenous E-Commerce Environments, IEEE 2002.*  
7 Coordinate Systems, Transformations and Units—SVG 1.1—20030114 . [Online]. World Wide Web Consortium, [Retrieved on Jul. 25, 2005]. Retrieved from the Internet:<URL:http: // www.w3.org/TR/SVG/coords.html>., "7.8 The preserveAspectRatio attribute", 2003.

* cited by examiner

*Primary Examiner* — Chan S Park  
*Assistant Examiner* — Mark Roz  
(74) *Attorney, Agent, or Firm* — Oblon, Spivak, McClelland, Maier & Neustadt, L.L.P.

(57) ABSTRACT

An image data processing apparatus includes a processing unit that detects an attribute of image data input. The image data processing apparatus also includes a network interface that receives content data from an external section. When the processing unit detects that the image data is contained in a predetermined location of the content data, the processing unit processes, based on the attribute detected and in accordance with an aspect ratio of a display section where the image data is to be displayed, the image data such that a horizontal to vertical ratio of the image data is kept when the image data is displayed on the display section.

11 Claims, 23 Drawing Sheets

IMAGE DATA PROCESSING DEVICE, IMAGE DATA PROCESSING METHOD, AND IMAGE DATA PROCESSING PROGRAM

TECHNICAL FIELD

The present invention relates to an image data processing apparatus, and is preferably applied to an image display device that displays, based on image data supplied from outside, an image, for example.

BACKGROUND ART

In the field of this kind of image display device, various types of image display devices with different aspect ratios are here to stay, such as an image display device capable of displaying an image in aspect ratio of 4:3 and an image display device capable of displaying an image in aspect ratio of 16:9.

For example, there are two types of image display devices: an image display device (also referred to as a first image display device) having a display section DP10 (FIG. 22B) capable of displaying an image in aspect ratio of 3:2 (720× 480 pixels); and an image display device (also referred to as a second display device) having a display section DP20 (FIG. 22B) capable of displaying an image in aspect ratio of 8:6 (640×480 pixels).

On the other hand, as shown in FIG. 22A, there is image data D10 which was produced in order for the first image display device with aspect ratio of 3:2 to display an image P10. When the image data D10 is supplied to the first image display device, the first image display device displays, based on the image data D10 supplied, a screen SC10 on the display section DP10 as shown in FIG. 22B. In this case, the image 10 on the screen SC10 is displayed in a horizontal-to-vertical ratio of 1:1 (horizontal and vertical size: 72×72) which is intended by a creator who creates the image P10.

However, if the image data D10 is supplied to the second image display device, the second image display device displays, based on the image data D10 supplied, the whole screen SC10 within the display section DP20 with aspect ratio of 8:6. This changes the shape of the image DP10 on the screen SC10, displaying the image P10 in a different horizontal to vertical ratio (≠1:1, i.e. in the horizontal and vertical size of 64×72) not intended by the creator. This may cause a problem regarding copyright.

The following is one way to solve the problem. In this case, to adjust a horizontal-to-vertical ratio of an image, an image display device previously performs a process to compress or enlarge image data in vertical or horizontal direction (this process will be referred to as a horizontal-to-vertical ratio adjustment process). This keeps a horizontal-to-vertical ratio of the image displayed on a display section in line with creator's intention (For example, Patent Document 1).

Patent Document 1: Japanese Patent Publication No. 2000-227785

DISCLOSURE OF THE INVENTION

By the way, in recent years, an image display device, which is the one connected to a personal computer and the like, displays a web page based on page data described in XML (eXtensible Markup Language) or the like and a plurality of image data in JPEG (Joint Photographic Experts Group) format or the like.

For example, a web page with an advertisement of a music CD (Compact Disc) displays, based on a plurality of image data, an image of artist's portrait, as well as images of buttons (which is selected by a user) and the like.

In a case in which this web page is displayed on a display section whose aspect ratio is different from the one intended by a web page creator, the conventional image display device performs a horizontal-to-vertical ratio adjustment process not only to the image data representing the images (such as the artist's portrait image) whose horizontal to vertical ratios should be kept in terms of copyright, but also to the image data representing the images (such as the button images) whose horizontal to vertical ratios are allowed to change. This decreases the processing efficiency of the image display device.

The present invention has been made in view of the above points and is intended to provide an image data processing apparatus capable of performing a process to adjust a horizontal to vertical ratio of specific image data.

To solve the above problem, an image data processing apparatus according to an embodiment of the present invention includes: attribute detection means for detecting attribute of image data input; and image data processing means for processing, based on the attribute detected and in accordance with an aspect ratio of a display section where the image data is displayed, the image data such that a horizontal to vertical ratio of the image data is kept when the image data is displayed on the display section.

In addition, an image data processing method according to an embodiment of the present invention includes: an attribute detection step of detecting attribute of image data input; and an image data processing step of processing, based on the attribute detected and in accordance with an aspect ratio of a display section where the image data is displayed, the image data such that a horizontal to vertical ratio of the image data is kept when the image data is displayed on the display section.

Furthermore, an image data processing program according to an embodiment of the present invention causes a computer to execute: an attribute detection step of detecting attribute of image data input; and an image data processing step of processing, based on the attribute detected and in accordance with an aspect ratio of a display section where the image data is displayed, the image data such that a horizontal to vertical ratio of the image data is kept when the image data is displayed on the display section.

In this manner, they detect the attribute of the image data input, and then performs, in response to a result of the detection, a process to keep the horizontal and vertical ratio. Therefore, only specific image data whose attribute indicates that its horizontal to vertical ratio should be kept is processed.

The image data processing apparatus, image data processing method and image data processing program according to an embodiment of the present invention detect the attribute of the image data input, and then performs, in response to a result of the detection, a process to keep the horizontal and vertical ratio. Therefore, only specific image data whose attribute indicates that its horizontal to vertical ratio should be kept is processed. Thus, the image data processing apparatus, image data processing method and image data processing program provide various effects such as improving the processing efficiency.

BEST MODE FOR CARRYING OUT THE INVENTION

An embodiment of the present invention will be described in detail with reference to the accompanying drawings.

(1) Music Related Service Provision System (1-1) Configuration of the System

Figure 1:
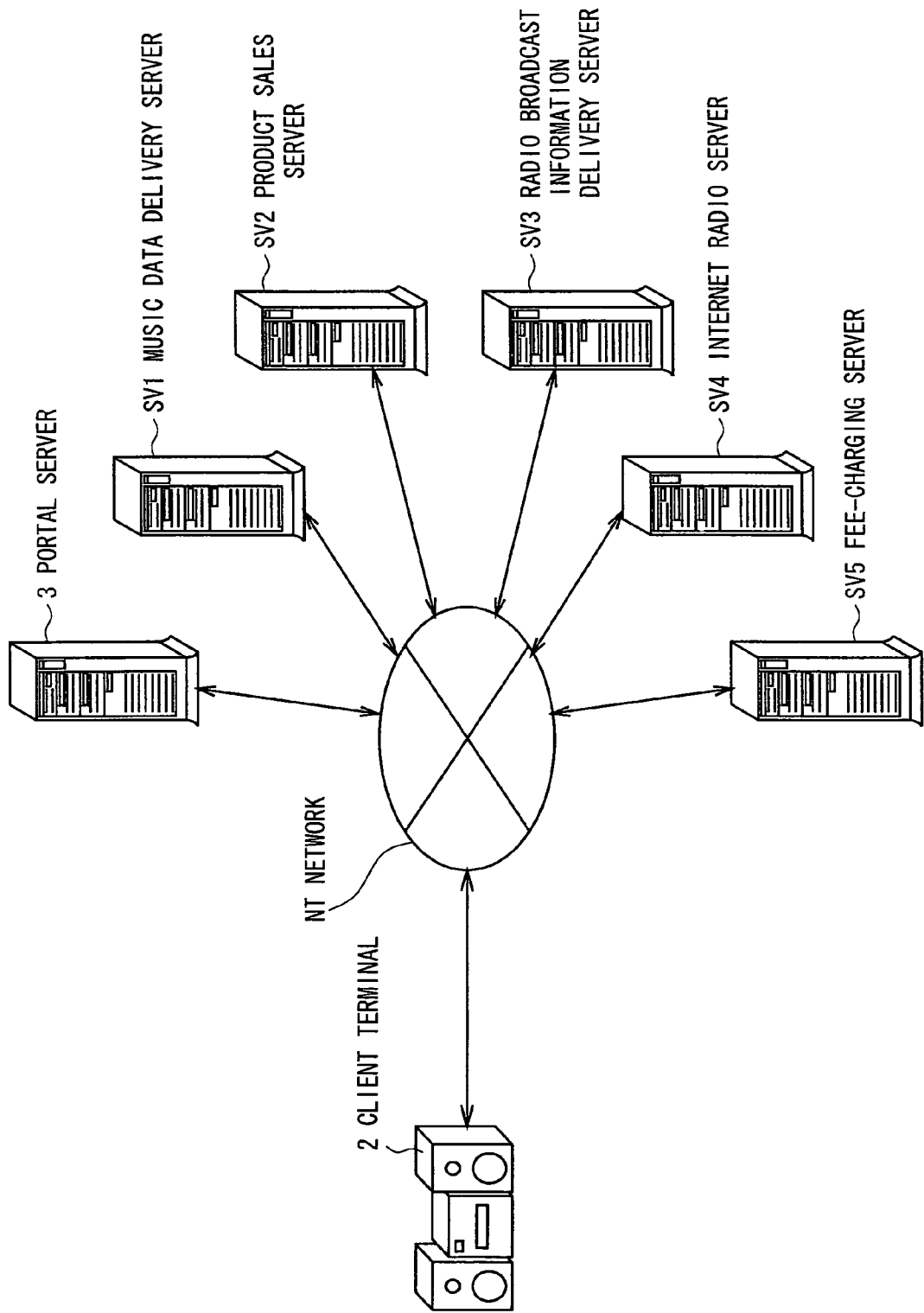
FIG. 1 is a schematic diagram showing the overall configuration of a music related service provision system in accordance with an embodiment of the present invention.

Referring to FIG. 1, the reference numeral 1 represents a music related service provision system as a whole. The music related service provision system 1 includes a client terminal 2 whose user has contracted with a company operating the music related service provision system 1; a portal server 3, which controls the client terminal 2; and a plurality of servers SV1 through SV5, which provides the client terminal 2 with various services related to music.

In this embodiment, the music data delivery server SV1 provides a music data distribution service of distributing music data to the client terminal 2. The music data has been converted into a format such as ATRAC3 (Adaptive Transform Acoustic Coding 3), AAC (Advanced Audio Coding), WMA (Windows (Registered Trademark) Media Audio), Real-AUDIO G2 Music Codec, MP3 (MPEG Audio Layer-3), and the like.

A product sales server SV2 provides a sales service of selling CDs (Compact Discs), DVDs (Digital Versatile Discs), and the like to users through the client terminal 2.

A radio broadcast information delivery server SV3 provides a radio broadcast information distribution service of distributing to the client terminal 2 radio broadcast information related to music and radio programs broadcast by radio stations.

An Internet radio server SV4 provides an Internet radio broadcast service. In the Internet radio broadcast services, the Internet radio server SV4 supplies radio broadcast data in streaming format to the client terminal 2 via a network NT. In this case, the network NT is equivalent to the Internet.

A fee-charging server SV5 performs a fee-charging process to charge users various fees in response to requests from the portal server 3 and the like.

(1-2) Configuration of Client Terminal 2

(1-2-1) Functional Circuit Block Configuration of Client Terminal 2

Figure 2:
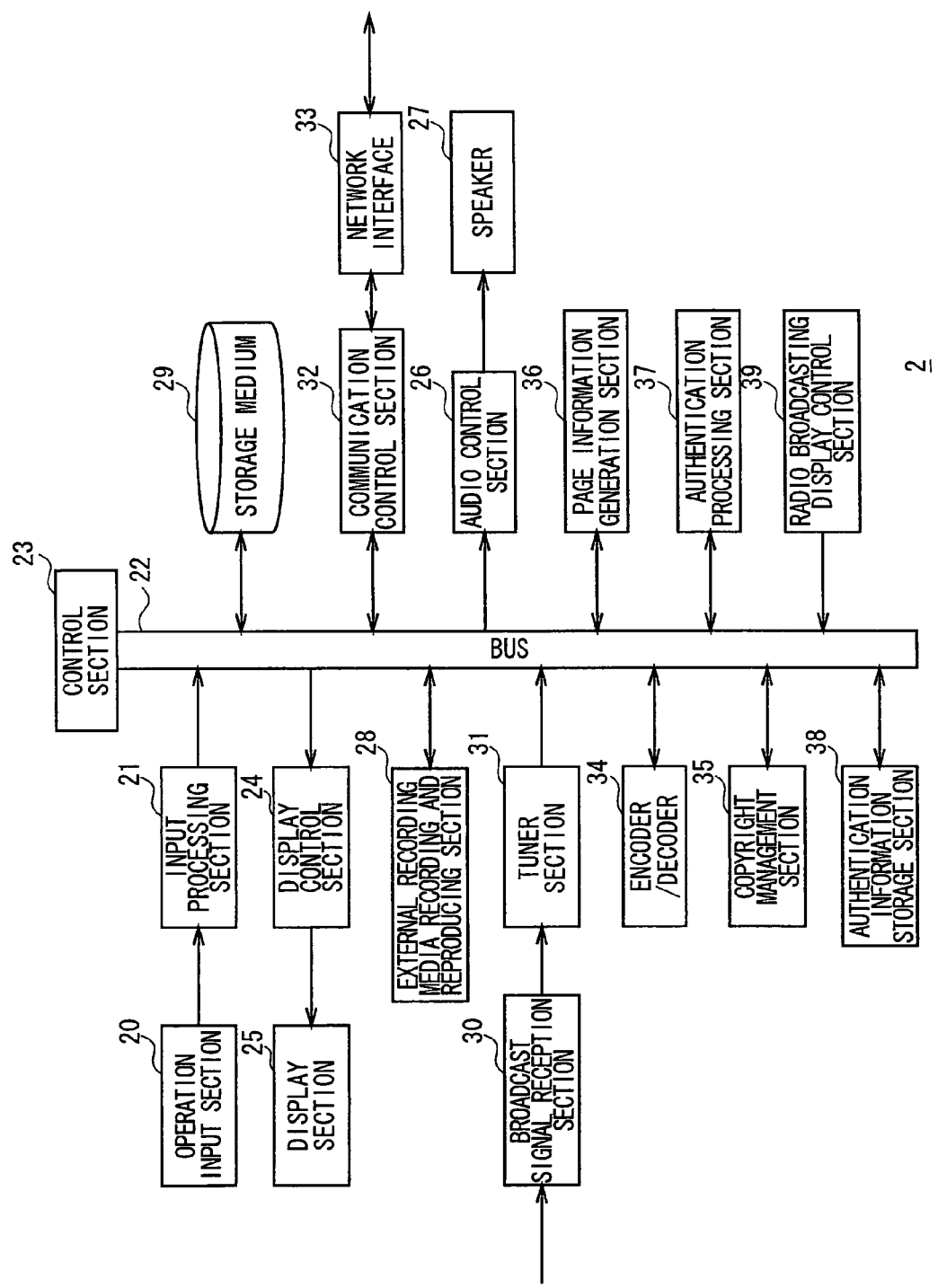
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 including various kinds of buttons. The operation input section 20 is disposed on a housing of the client terminal 2 or remote control (not shown). If a user operates the operation input section 20, the operation input section 20 detects the operation, and then supplies an operation input signal corresponding to the operation to an input processing section 21.

The input processing section 21 transforms the operation input signal supplied from the operation input section 20 into a specific operation command, and then transmits the operation command to a control section 23 through a bus 22.

The control section 23 has been connected to each circuit via the bus 22. The control section 23 controls operation of each circuit based on the operation command and a control signal supplied from the circuits.

A display control section 24 receives video data through the bus 22, and then performs digital-to-analog conversion to the video data to generate an analog video signal. The display control section 24 subsequently supplies the analog video signal to a display section 25.

The display section 25, which is for example a display device such as a liquid crystal display, may be disposed on the housing directly or externally.

The display section 25 receives the analog video signal from the display control section 24, and then displays an image based on the analog video signal. The analog video signal includes a result of processing by the control section 23 or various video data.

An audio control section 26 receives audio data via the bus 22, and then performs digital-to-analog conversion to the audio data to generate an analog audio signal. The audio control section 26 then transmits the analog audio signal to a speaker 27 which then outputs audio based on the analog audio signal supplied from the audio control section 26.

External storage media such as CDs and "MEMORY STICK (Registered Trademark of Sony Corporation)" for example store content data. The "MEMORY STICK (Registered Trademark of Sony Corporation)" includes a flash memory covered with an exterior case. An external recording media recording and reproducing section 28 reads content data from external storage media, and then plays back them. Alternatively, the external recording media recording and reproducing section 28 records content data, which is to be recorded, on external storage media.

When the external recording media recording and reproducing section 28 acquires content data such as video data from an external storage medium, the external recording media recording and reproducing section 28 then transmits the video data to the display control section 24 through the bus 22.

The display control section 24 transforms the video data, which are read out from the external storage medium as content data by the external recording media recording and reproducing section 28, into an analog video signal, and then transmits the analog video signal to the display section 25.

When the external recording media recording and reproducing section 28 acquires content data such as audio data from an external storage medium, the external recording media recording and reproducing section 28 then transmits the audio data to the audio control section 26 via the bus 22.

The audio control section 26 transforms the audio data, which are read from the external storage medium as content data by the external recording media recording and reproducing section 28, into an analog audio signal, and then transmits the analog audio signal to the speaker 27.

The control section 23 supplies the content data read from external storage media by the external recording media recording and reproducing section 28 through the bus 22 to a storage medium 29 in the client terminal 2 to store the content data in the storage medium 29 (storing content data in the storage medium 29 as described above is referred to as ripping).

When the control section 23 acquires content data such as video data from the storage medium 29, the control section 23 then supplies the video data to the display control section 24 through the bus 22. The video data are for example equivalent to image data.

When the control section 23 acquires content data such as audio data from the storage medium 29, the control section 23 then supplies the audio data to the audio control section 26 via the bus 22.

The control section 23 also reads music data from the storage medium 29, and then supplies the music data to the external recording media recording and reproducing section 28 to records the music data on the external storage media.

A broadcast signal reception section 30 receives radio waves from each broadcast station, and then transmits the radio waves to a tuner section 31.

In a case in which a user operates the operation input section 20 to specify a certain radio station, the tuner section 31 under the control of the control section 23 extracts a radio broadcast signal of frequency corresponding to the station specified from the radio waves received by the broadcast signal reception section 30. The tuner section 31 then performs a prescribed reception process to generate audio data, and then supplies the audio data to the audio control section 26 via the bus 22.

The audio control section 26 receives the audio data from the tuner section 31, and then transforms the audio data into an analog audio signal. The audio control section 26 subsequently transmits the analog audio signal to the speaker 27 which then outputs audio of a radio program broadcast from a radio station. Thus, a user can listen to audio of a radio program.

The control section 23 supplies the audio data from the tuner section 31 to the storage medium 29 which then stores the audio data. In this manner, the control section 23 can record audio of a radio program.

The control section 23 also connects to the network NT through a communication control section 32 and a network interface 33. The control section 23 therefore can access the portal server 3 and other servers SV1 through SV4 on the network NT. The control section 23 interchanges various information and data with the portal server 3 and other servers SV1 through SV4.

An encoder/decoder section 34 decodes compressed-coded content data, and then transmits the compressed-coded content data to the display control section 24 or the audio control section 26. The compressed-coded content data is for example obtained from the network NT through the network interface 33 and the communication control section 32. Alternatively, the compressed-coded content data is for example obtained from the storage medium 29 or external storage media.

The encoder/decoder section 34 performs a compression encoding process to generate compressed-coded content data, and then supplies the compressed-coded content data to the storage medium 29. In this case, the content data from external storage media, which is neither compressed nor encoded, the audio data from the tuner section 31, and the like are compressed and encoded by the encoder/decoder section 34.

Accordingly, the content data compressed and encoded by the encoder/decoder section 34 is stored in the storage medium 29 under the control of the control section 23.

The copyright management section 35 generates copyright management information about the content data downloaded from the network NT through the network interface 33 and the communication control section 32. The copyright management section 35 also generates copyright management information about the content data read from external storage media by the external recording media recording and reproducing section 28.

The copyright management information generated by the copyright management section 35 is associated with corresponding content data, and then stored in the storage medium 29 under the control of the control section 23.

The copyright management section 35 properly updates copyright management information associated with content data, when a check-out process of content data between the storage medium 29 and a specific external storage medium is performed, or when a check-in process of content data between the storage medium 29 and a specific external storage medium is performed. In this manner, the copyright management section 35 protects copyright of the content data.

A page information generation section 36 interprets page information, which includes XML (eXtensible Markup Language) files or HTML (Hyper Text Markup Language) files obtained from the network NT via the network interface 33 and the communication control section 32, to generate the video data to be displayed on the display section 25. The page information generation section 36 then supplies the video data to the display control section 24.

An authentication processing section 37 connects to the portal server 3 and other servers SV1 through SV4 on the network NT through the network interface 33. The authentication processing section 37 performs an authentication process such as transmitting authentication information to the portal server 3 and other servers SV1 through SV4 through the communication control section 32 and the network interface 33.

An authentication information storage section 38 stores the authentication information the authentication processing section 37 uses to access the portal server 3 and other servers SV1 through SV4.

A radio broadcasting display control section 39 currently receiving a radio program which a user listens to transmits a request signal, which requests radio broadcast information about the radio program, to the radio broadcast information delivery server SV3, which corresponds to a radio station currently broadcasting the radio program, through the communication control section 32 and the network interface 33.

As a result, the radio broadcasting display control section 39 receives the radio broadcast information from the radio information delivery server SV3 on the network NT via the network interface 33 and the communication control section 32, and then supplies the radio broadcast information to the display control section 24. The display control section 24 displays on the display section 25 the radio broadcast information including a title of the radio program being received, a title of the music being received, an artist name of the music, and the like.

(1-2-2) Directory Management

Figure 3:
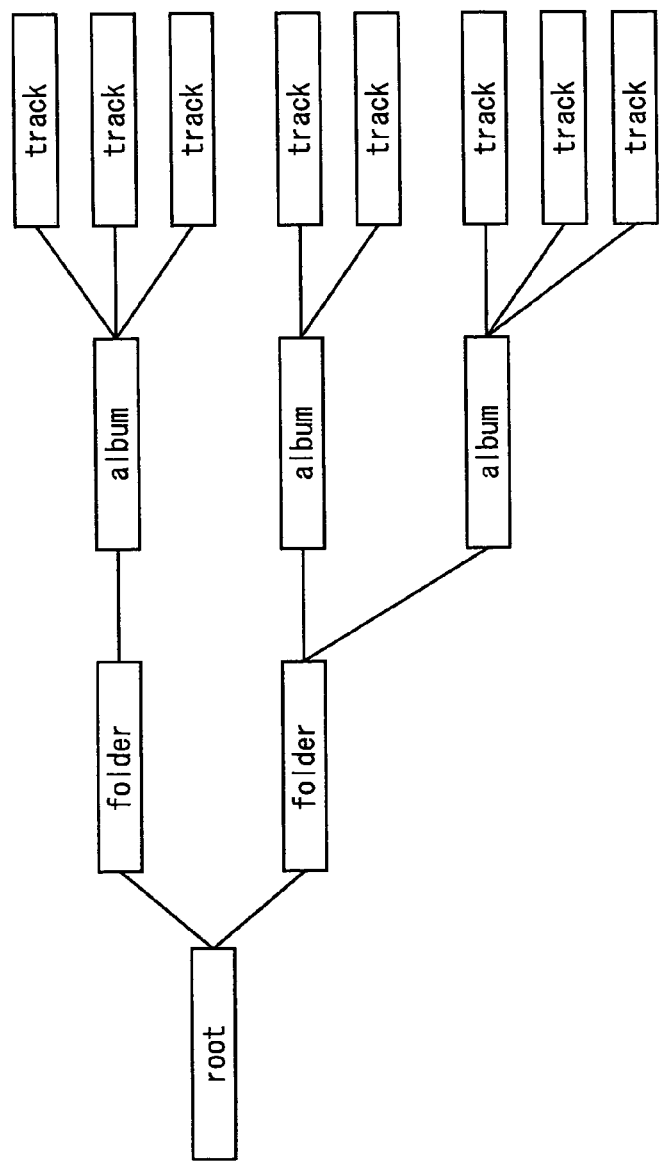
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
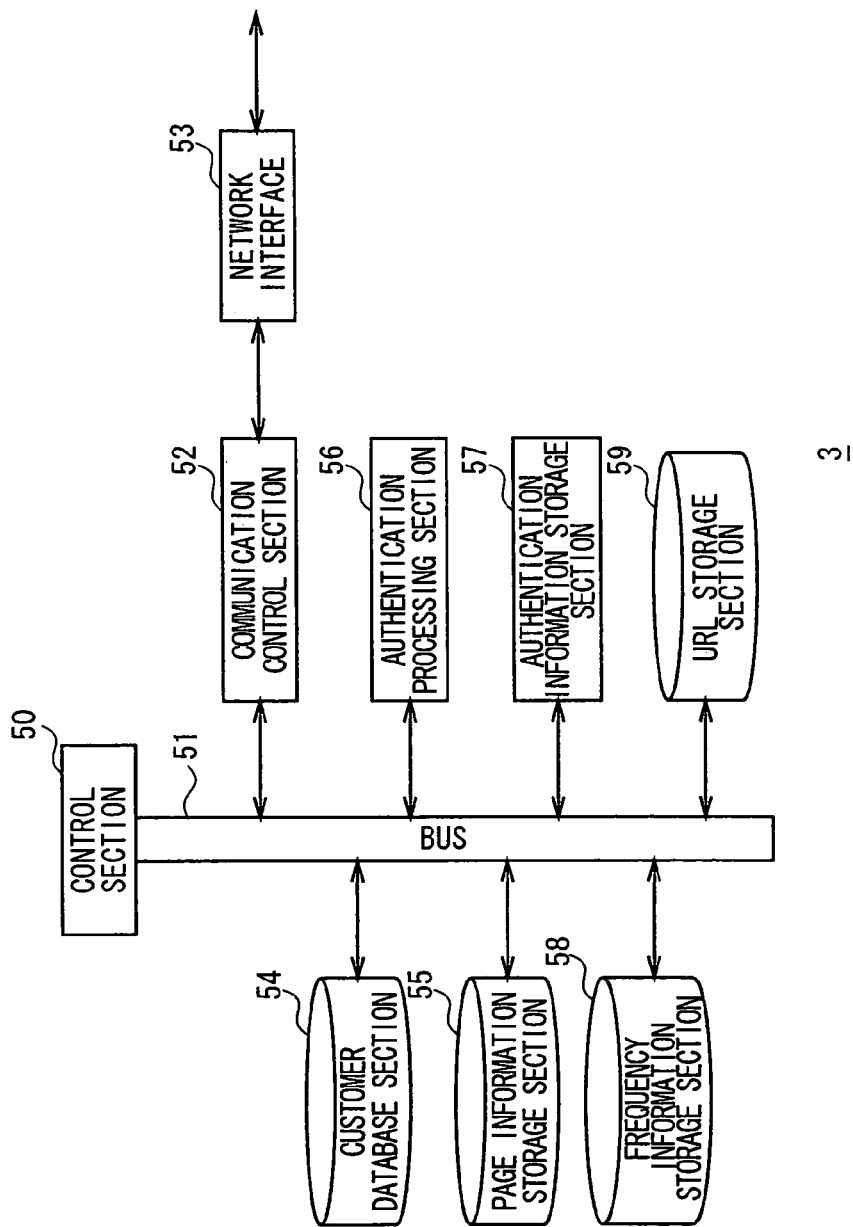
FIG. 4 is a block diagram showing the hardware configuration of a portal server using functional circuit blocks.

With reference to FIG. 4, the hardware configuration of the portal server 3 will be described using functional circuit blocks. The control section 50 of the portal server 3 controls operation of each circuit connected via a bus 51.

A communication control section 52 under the control of the control section 50 interchanges various kinds of information with the client terminal 2 and other servers SV1 through SV5 via a network interface 53.

A customer database section 54 stores a user ID (Identification) of a user who has contracted with a company operating the music related service provision system 1, along with its password information as customer information.

A page information storage section 55 stores page information and the like. The page information is being managed by the company operating the music related service provision system 1.

By the way, the page information is described in XML language or the like. The page information includes URL (Uniform Resource Locator) information to be used to access the music data delivery server SV1, the product sales server SV2, the radio broadcast information delivery server SV3, the Internet radio server SV4 and the like.

An authentication processing section 56 receives the user ID information and password information from the client terminal 2 through the network interface 53 and the communication control section 52, and then performs a user authentication process. In the processes of user authentication, the authentication processing section 56 checks whether or not the received user ID information and password information have been registered in the customer database section 54 as customer information.

After completing the user authentication processes, the authentication processing section 56 issues "portal authentication result information (equivalent to "authentication session ID information" described below)" showing a result of the user authentication process. The authentication processing section 56 then temporarily stores the portal authentication result information in an authentication information storage section 57.

If the result of the user authentication processes by the authentication processing section 56 indicates a fact that the user is legitimate, the control section 50 transmits contractor's page information and portal authentication result information to the client terminal 2 via the communication control section 52 and the network interface 53. The contractor's page information has been stored in a page information storage section 55.

If the result of the user authentication processes by the authentication processing section 56 indicates a fact that the user is not legitimate, the control section 50 may transmit authentication error information and authentication failure notification page information to the client terminal 2 via the communication control section 52 and the network interface 53. In this case, the authentication failure notification page information showing a failure of authentication has been stored in the page information storage section 55.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs an authentication process of a user. In this case, the authentication processing section 56 receives the portal authentication result information from the user's client terminal 2 via the network interface 53 and the communication control section 52, and then compares the portal authentication result information with the one which corresponds to the user and is temporarily stored in the authentication information storage section 57.

The authentication processing section 56 performs an authentication process to the portal authentication result information that the client terminal 2 received from the music data delivery server SV1, the product sales server SV2 or the radio broadcast information delivery server SV3. In the authentication processes, the authentication processing section 56 performs a check process to check whether or not the received portal authentication result information is legitimate, and then transmits check result information showing a result of the check through the communication control section 52 and the network interface 53 to the music data delivery server SV1, the product sales server SV2 or the radio broadcast information delivery server SV3.

A frequency information storage section 58 associates the following items together to memorize: a regional code identifying a region, such as a postal code; frequency information showing a radio broadcast frequency receivable in the region; a name of a radio station (which is also referred to as "radio station name") which broadcasts radio programs; and a call sign, which is identification information unique to each radio station.

A URL storage section 59 associates call signs of radio stations with corresponding URL information to stores them. The call sign is unique to each radio station which broadcasts radio programs. The URL information is utilized to a radio broadcast information. The radio broadcast information includes information about a radio program currently broadcast from a radio station which corresponds to the call sign associated. The radio broadcast information, which is also referred to as "now-on-air information", for example includes a title of a radio program, and a title of music currently played in the radio program.

(1-4) Functional Circuit Block Configuration of Music Data Delivery Server SV1

Figure 5:
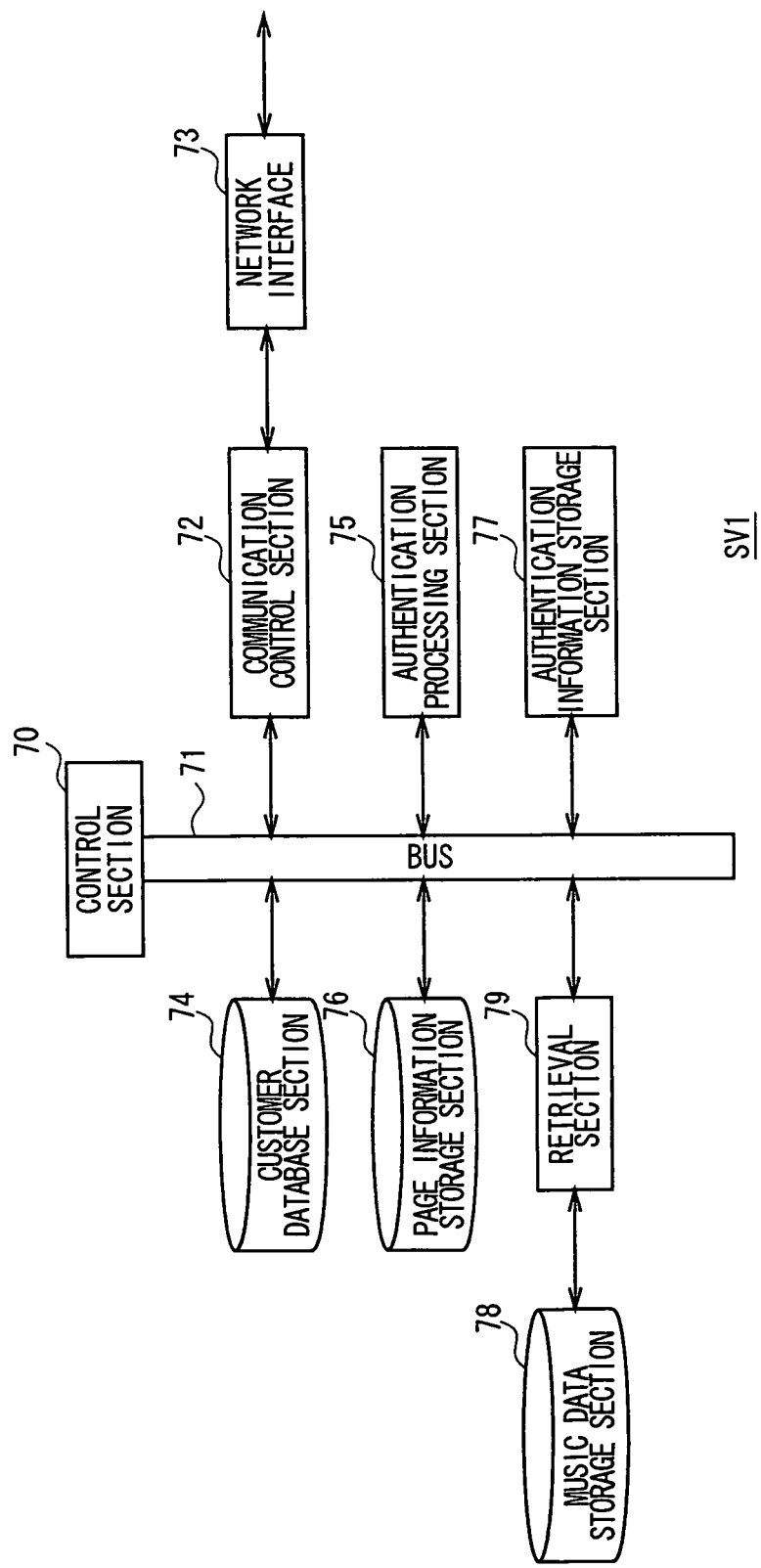
FIG. 5 is a block diagram showing the hardware configuration of a music data delivery server using functional circuit blocks.

With reference to FIG. 5, the configuration of the music data delivery server SV1 will be described using functional circuit blocks. The control section 70 of the music data delivery server SV1 controls operation of each circuit connected via a bus 71.

A communication control section 72 under the control of the control section 70 interchanges various kinds of information and various kinds of data such as content data with the client terminal 2, the portal server 3, and the like via a network interface 73.

A customer database section 74 stores user ID information of a user who has contracted with a company operating the music data delivery server SV1, along with its password information as customer information. By the way, an authentication processing section 75 may have capabilities to authenticate a user based on portal authentication result information (this portal authentication result information is issued by the portal server 3 to the client terminal 2 and transmitted from the client terminal 2 to the music data delivery server SV1). In this case, the customer database section 74 can be omitted.

A page information storage section 76 stores page information, which is utilized for distribution of music data and presenting downloadable music data (this page information is also referred to as "music-data-distribution page information"), and the like. The page information is managed by the music data delivery server SV1.

The music-data-distribution page information, described in the XML language or the like, has a structure through which a user of the client terminal 2 can select the music data he/she wants to download.

When the client terminal 2 transmits a page information acquisition request signal, which requests the music-data-distribution page information, the control section 70 receives the page information acquisition request signal via the network interface 73 and the communication control section 72. The control section 70 then transmits, in response to the page information acquisition request signal, the music-data-distribution page information stored in the page information storage section 76 to the client terminal 2 via the communication control section 72 and the network interface 73.

When the client terminal 2 transmits the user's user ID information and the password information, the authentication processing section 75 receives the user ID information and the password information via the network interface 73 and the communication control section 72. The authentication processing section 75 then performs a user authentication process. In the user authentication process, the authentication processing section 75 checks whether or not the user ID information and password information received has been registered in the customer database section 74 as customer information.

The authentication processing section 75 may perform another user authentication process, which is different from the one which uses the user ID information and the password information. In this case, the client terminal 2 supplies portal authentication result information (equivalent to an "authentication ticket" described below) issued by the portal server 3. The authentication processing section 75 receives the portal authentication result information via the network interface 73 and the communication control section 72, and then supplies the portal authentication result information to the portal server 3 via the communication control section 72 and the network interface 73.

In this manner, the portal authentication result information is supplied from the authentication processing section 75 to the portal server 3. The portal server 3 then performs an authentication process to the portal authentication result information (i.e. the check process described above), and then supplies the check results information. The authentication processing section 75 receives the check results information via the network interface 73 and the communication control section 72, and then checks whether or not the user is legitimate based on the check results information. In this case, a legitimate user is the one who has contracted with a company operating the music related service provision system 1.

After completing the user authentication process, the authentication processing section 75 issues server authentication result information (equivalent to a "service session ID information" described below). The server authentication result information shows a result of the user authentication process.

If the result of the user authentication process by the authentication processing section 75 indicates a fact that the user is legitimate, the control section 70 transmits the music-data-distribution page information and the server authentication result information to the client terminal 2 via the communication control section 72 and the network interface 73. The music-data-distribution page information for contractors has been stored in the page information storage section 76.

By contrast, when the result of the user authentication process by the authentication processing section 75 shows a fact that the user is not legitimate, the control section 70 transmits authentication error information and authentication failure notification page information to the client terminal 2 via the communication control section 72 and the network-interface 73. In this case, the authentication failure notification page information showing a failure of authentication has been stored in the page information storage section 76.

By the way, an authentication information storage section 77 temporarily stores the server authentication result information issued by the authentication processing section 75. The authentication information storage section 77 also stores other authentication information which is necessary for the authentication processing section 75 to authenticate a user of the client terminal 2.

A music data storage section 78 has stored compressed-coded music data associated with corresponding retrieval-keys. The music data has been compressed and encoded in ATRAC3 format, MP3 format, or the like. The retrieval key is equivalent to content ID information and the like.

By the way, after the music-data-distribution page information is transmitted to the client terminal 2, the client terminal 2 may transmit a download request signal. The download request signal requests download of music data which a user wants to download, and includes a retrieval key for searching the music data. A retrieval section 79 receives the download request signal via the network interface 73 and the communication control section 72, and then obtains the retrieval key from the download request signal.

The retrieval section 79 then searches a plurality of music data stored in the music data storage section 78 for the music data which meets a retrieval condition indicated by the retrieval key. That is to say, the retrieval section 79 searches for the music data which a user wants to download.

As a result, the control section 70 transmits the searched music data (which a user wants to download) to the client terminal 2 via the communication control section 72 and the network interface 73.

At this time, the control section 70 transmits fee-charging information to the fee-charging server SV5 via the communication control section 72 and the network interface 73. The fee-charging information is used to charge users a fee for the music data downloaded to the client terminal 2. The fee-charging server SV5 performs a fee-charging process to charge the user a fee for the downloaded music-data.

(1-5) Functional Circuit Block Configuration of Product Sales Server SV2

Figure 6:
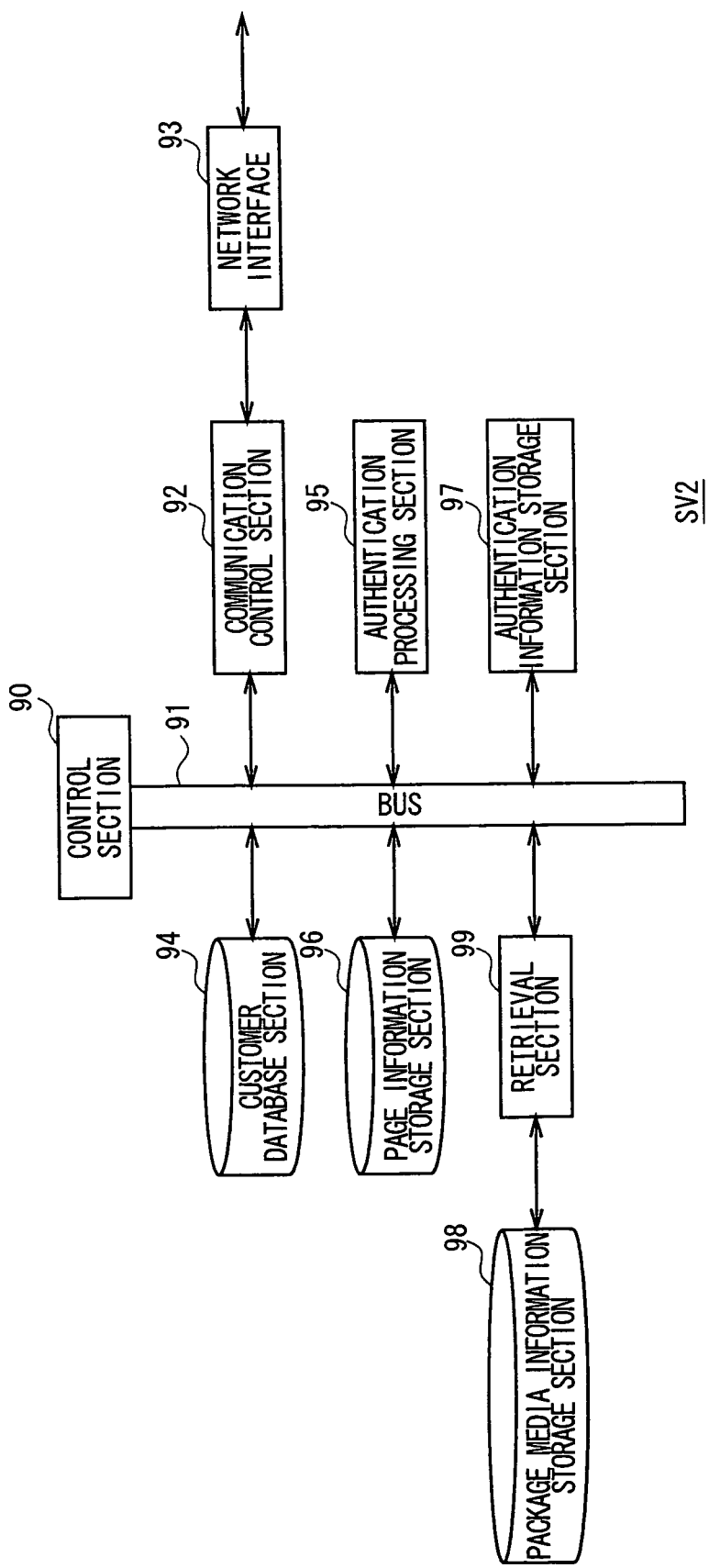
FIG. 6 is a block diagram showing the hardware configuration of a product sales server using functional circuit blocks.

With reference to FIG. 6, the hardware configuration of the product sales server SV2 will be described using functional circuit blocks. A control section 90 of the product sales server SV2 controls operation of each circuit connected via a bus 91.

A communication control section 92 under the control of the control section 90 interchanges various kinds of information with the client terminal 2, the portal server 3, and the like via a network interface 93.

A customer database section 94 stores user ID information of a user who has contracted with a company operating the product sales server SV2, along with its password information, as customer information. By the way, an authentication processing section 95 may have capabilities to authenticate a user based on portal authentication result information (this portal authentication result information is issued by the portal server 3 to the client terminal 2 and transmitted from the client terminal 2 to the product sales server SV2). In this case, the customer database section 94 can be omitted.

A page information storage section 96 stores page information, which is utilized for sales of package media and presenting package media such as CDs and DVDs for sale (this page information is also referred to as "package-media-sales page information"), and the like. The page information is managed by the product sales server SV2.

The package-media-sales page information, described in the XML language or the like, has a structure through which a user of the client terminal 2 can select package media such as CDs and DVDs which the user wants to buy.

When the client terminal 2 transmits a page information acquisition request signal, which requests the package-media-sales page information, the control section 90 receives the page information acquisition request signal via the network interface 93 and the communication control section 92. The control section 90 then transmits, in response to the page information acquisition request signal, the package-media-sales page information stored in the page information storage section 96 to the client terminal 2 via the communication control section 92 and the network interface 93.

When the client terminal 2 transmits the user's user ID information and the password information, the authentication processing section 95 receives the user ID information and the password information via the network interface 93 and the communication control section 92. The authentication processing section 95 then performs a user authentication process. In the user authentication process, the authentication processing section 95 checks whether or not the user ID information and password information received has been registered in the customer database section 94 as customer information.

The authentication processing section 95 may perform another user authentication process, which is different from the one that uses the user ID information and the password information. In this case, the client terminal 2 transmits portal authentication result information (equivalent to an "authentication ticket" described below) issued by the portal server 3. The authentication processing section 95 receives the portal authentication result information via the network interface 93 and the communication control section 92, and then transmits the portal authentication result information to the portal server 3 via the communication control section 92 and the network interface 93.

In this manner, the portal authentication result information is transmitted from the authentication processing section 95 to the portal server 3. The portal server 3 then performs an authentication process to the portal authentication result information (i.e. the check process described above), and then transmits check results information. The authentication processing section 95 receives the check results information via the network interface 93 and the communication control section 92, and then checks whether or not the user is legitimate based on the check results information. In this case, a legitimate user is the one who has contracted with a company operating the music related service provision system 1.

After completing the user authentication process, the authentication processing section 95 issues server authentication result information (equivalent to a "service session ID information" described below). The server authentication result information shows a result of the user authentication process.

When the result of the user authentication process by the authentication processing section 95 indicates a fact that the user is legitimate, the control section 90 transmits the package-media-sales page information and the server authentication result information to the client terminal 2 via the communication control section 92 and the network interface 93. The package-media-sales page information for contractors has been stored in the page information storage section 96.

Whereas when the result of the user authentication process by the authentication processing section 95 shows a fact that the user is not legitimate, the control section 90 transmits authentication error information and authentication failure notification information to the client terminal 2 via the communication control section 92 and the network interface 93. In this case, the authentication failure notification information showing a failure of authentication has been stored in the page information storage section 96.

An authentication information storage section 97 temporarily stores the server authentication result information issued by the authentication processing section 95. The authentication information storage section 97 also stores other authentication information which is necessary for the authentication processing section 95 to authenticate a user of the client terminal 2.

A package media information storage section 98 has stored a plurality of pieces of package media information associated with corresponding retrieval keys. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information about package media such as CDs and DVDs. A retrieval section 99 receives the media information request signal via the network interface 93 and the communication control section 92, and then obtains a retrieval key from the media information request signal. The retrieval key is used to retrieve a specific package medium.

The retrieval section 99 then searches a plurality of piece of package media information stored in the package media information storage section 98 for a piece of package media information which meets a retrieval condition indicated by the retrieval key.

As a result, the control section 90 transmits the searched package media information to the client terminal 2 via the communication control section 92 and the network interface 93, and therefore shows a user the package media information about the specific package medium.

When the client terminal 2 transmits a purchase request signal, which requests a purchase of the package medium, the control section 90 receives the purchase request signal via the network interface 93 and the communication control section 92, and then performs a sale process. In the sale processes, the control section 90 for example performs a shipping procedure to ship the package medium to the user of the client terminal 2.

At this time, the control section 90 transmits fee-charging information to the fee-charging server SV5 via the communication control section 92 and the network interface 93. The fee-charging information is used to charge a user a fee for the purchased package medium. The fee-charging server SV5 performs a fee-charging process to charge the user a fee for the purchased package medium.

After the fee-charging server SV5 completes the fee-charging processes for the user, the control section 90 subsequently transmits sale completion page information to the client terminal 2 via the communication control section 92 and the network interface 93. The sale completion page information shows a fact that the sale process of the package medium has been completed.

(1-6) Functional Circuit Block Configuration of Radio Broadcast Information Delivery Server SV3

Figure 7:
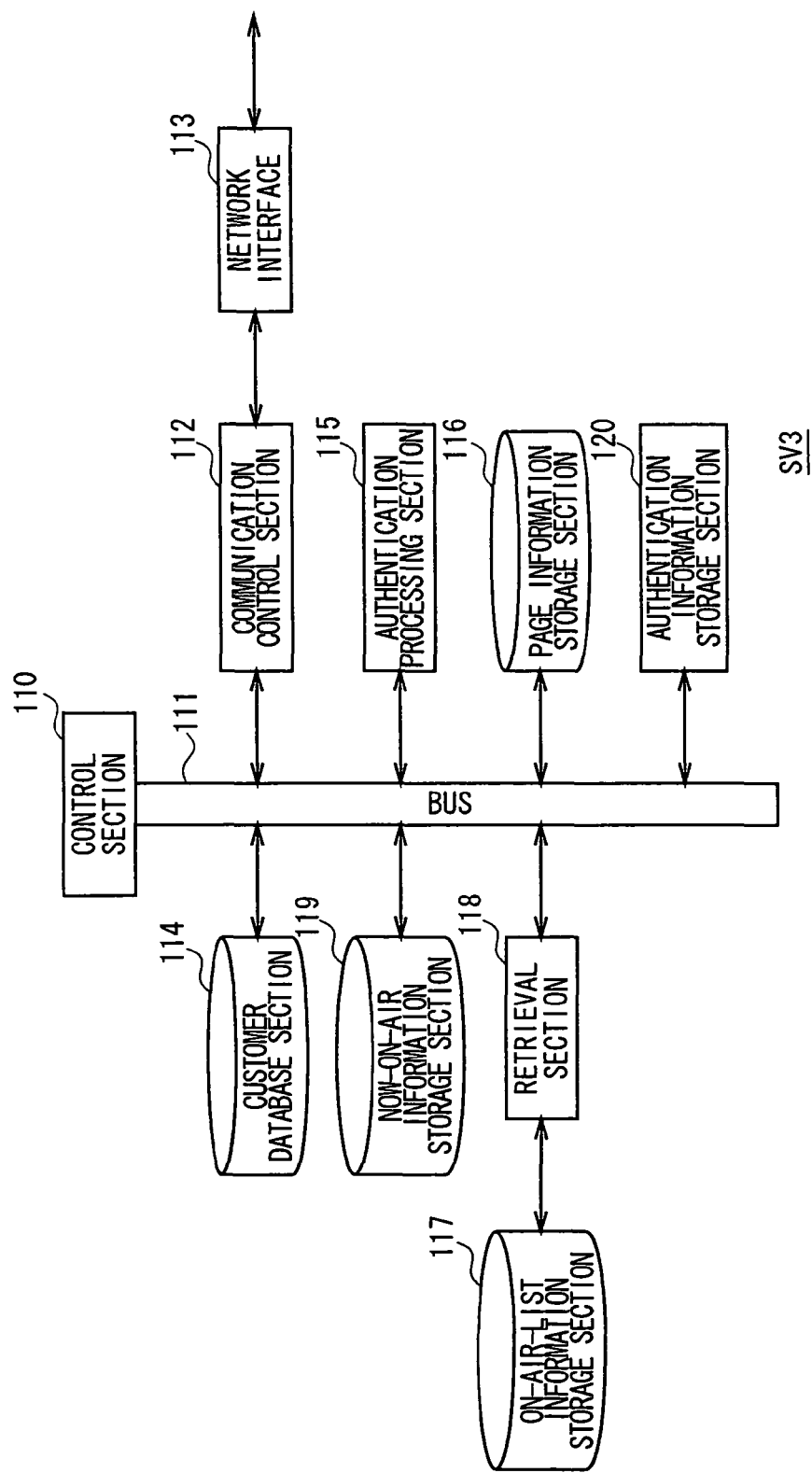
FIG. 7 is a block diagram showing the hardware configuration of a radio broadcast information delivery server using functional circuit blocks.

With reference to FIG. 7, the hardware configuration of the radio broadcast information delivery server SV3 will be described using functional circuit blocks. A control section 110 of the radio broadcast information delivery server SV3 controls operation of each circuit connected via a bus 111.

A communication control section 112 under the control of the control section 110 interchanges various kinds of information with the client terminal 2, the portal server 3, and the like via a network interface 113.

A customer database section 114 stores user ID information of a user who has contracted with a company operating the radio broadcast information delivery server SV3, along with its password information as customer information. By the way, an authentication processing section 115 may have capabilities to authenticate a user based on portal authentication result information (this portal authentication result information is issued by the portal server 3 to the client terminal 2 and transmitted from the client terminal 2 to the radio broadcast information delivery server SV3). In this case, the customer database section 114 can be omitted.

A page information storage section 116 stores page information which is used for acquisition of radio broadcast information, and the like. In this case, the radio broadcast information relates to radio programs which have already been broadcast from a radio station corresponding to the radio broadcast information delivery server SV3. The radio broadcast information is also referred to as "on-air-list information", and the page information used for acquisition of on-air-list information is also referred to as "on-air-list-information-distribution page information". The page information is managed by the radio broadcast information delivery server SV3.

The on-air-list-information-distribution page information, described in the XML language or the like, provides an input box and the like through which a user of the client terminal 2 can input retrieval keys of the on-air-list information which he/she wants to obtain. A radio program title, a date and time of broadcast of a radio program, and the like could be the retrieval key.

An on-air-list information storage section 117 stores on-air-list information. The on-air-list information is generated by listing the following information: a title of a radio program which has already been broadcast from a radio station corresponding to the radio broadcast information delivery server SV3; a start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112. The control section 110 then transmits, in response to the page information acquisition request signal, the on-air-list-information-distribution page information which has been stored in the page information storage section 116 to the client terminal 2 via the communication control section 112 and the network interface 113.

When a user inputs a retrieval key of on-air-list information the user wants to obtain through the on-air-list-information-distribution page information, the client terminal 2 transmits an on-air-list information request signal including the retrieval key. The on-air-list information request signal requests download of the on-air-list information. A retrieval section 118 receives the on-air-list information request signal via the network interface 113 and the communication control section 112, and then obtains the retrieval key from the on-air-list information request signal.

The retrieval section 118 then searches, based on the retrieval key, the whole on-air-list information stored in the on-air-list information storage section 117 to extract part of the on-air-list information which meets a retrieval condition indicated by the retrieval key. In this manner, part of on-air-list information the user wants to acquire is obtained.

The control section 110 subsequently transmits the obtained on-air-list-information to the client terminal 2 via the communication control section 112 and the network interface 113.

A now-on-air information storage section 119 stores now-on-air information. The now-on-air information is made up of the following items: a title of a radio program currently being broadcast from a radio station corresponding to the radio broadcast information delivery server SV3; a start and end time of broadcast of the program; an artist name and title of music currently being played in the program; a start time of broadcast of the music, and the like.

When the client terminal 2 transmits the user's user ID information and the password information with a now-on-air information request signal which requests now-on-air information, the authentication processing section 115 receives the user ID information and the password information via the network interface 113 and the communication control section 112. The authentication processing section 115 then performs a user authentication process. In the user authentication process, the authentication processing section 115 checks whether or not the user ID information and password information received has been registered in the customer database section 114 as customer information.

The authentication processing section 115 may perform another user authentication process. This user authentication process is different from the one which uses the user ID information and the password information. In this case, the client terminal 2 transmits portal authentication result information (equivalent to an "authentication ticket" described below) issued by the portal server 3. The authentication processing section 115 receives the portal authentication result information via the network interface 113 and the communication control section 112, and then transmits the portal authentication result information to the portal server 3 via the communication control section 112 and the network interface 113.

In this manner, the portal authentication result information is transmitted from the authentication processing section 115 to the portal server 3. The portal server 3 then performs an authentication process to the portal authentication result information (i.e. the check process described above), and then transmits check results information. The authentication processing section 115 receives the check results information via the network interface 113 and the communication control section 112, and then checks whether or not the user is legitimate based on the check results information. In this case, a legitimate user is the one who has contracted with a company operating the music related service provision system 1.

When completing the user authentication process, the authentication processing section 115 issues server authentication result information (equivalent to a "service session ID information" described below). The server authentication result information shows a result of the user authentication process.

When the result of the user authentication process by the authentication processing section 115 shows a fact that the user is legitimate, the control section 110 transmits the server authentication result information and the now-on-air information stored in the now-on-air information storage section 119 to the client terminal 2 via the communication control section 112 and the network interface 113.

Whereas when the result of the user authentication process by the authentication processing section 115 shows a fact that the user is not legitimate, the control section 110 transmits authentication error information and authentication failure notification page information to the client terminal 2 via the communication control section 112 and the network interface 113. In this case, the authentication failure notification page information showing a failure of authentication has been stored in the page information storage section 116.

As described above, when the control section 110 receives a request for now-on-air information from a user, the control section 110 supplies the now-on-air information, if the authentication result shows a fact that the user is legitimate. Whereas if the authentication result shows a fact that the user is not legitimate, the control section 110 does not provide a radio broadcast information delivery service. That is to say, the control section 110 does not supply the now-on-air information. The radio broadcast information delivery service is a service provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to authenticate a user of the client terminal 2.

(1-7) Brief Overview of Processes of Each Server

With reference to sequence charts shown in FIGS. 8 through 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process between Client Terminal 2 and Portal server 3

Figure 8:
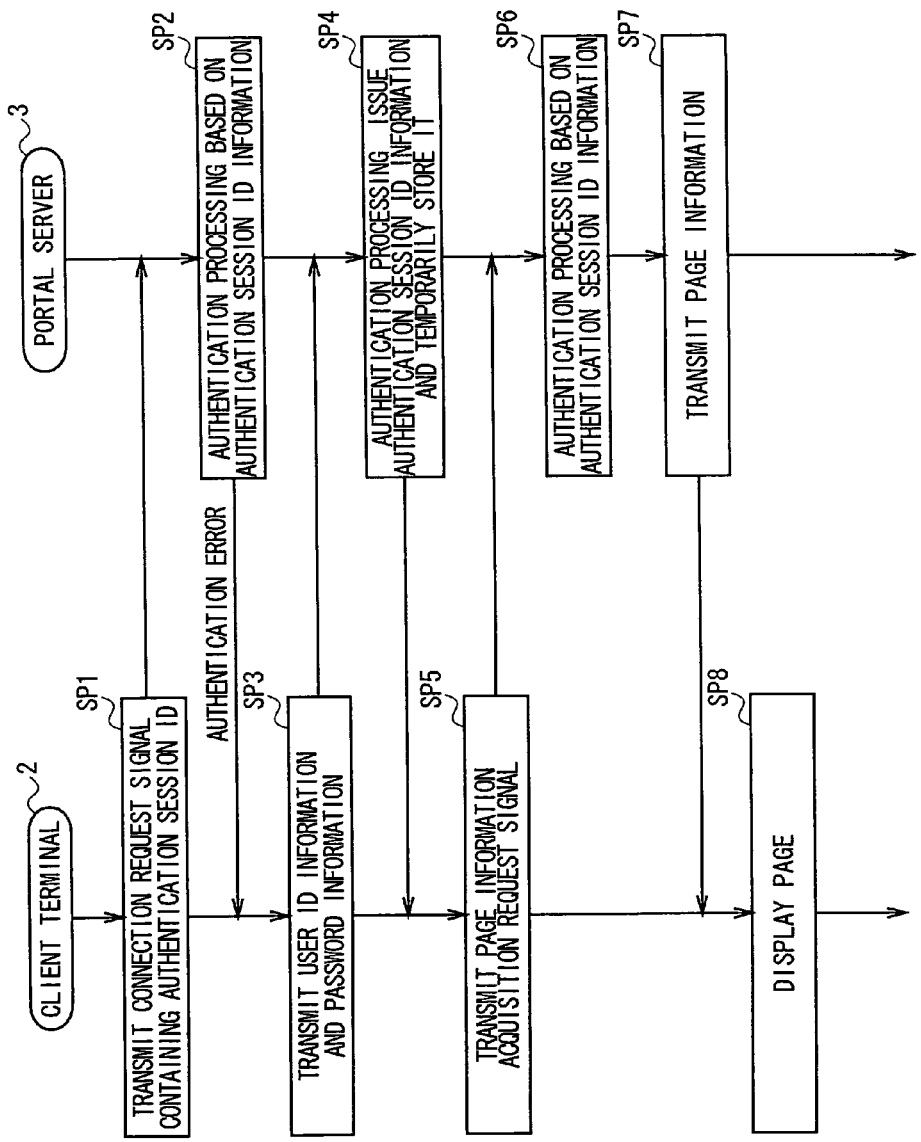
FIG. 8 is a sequence chart showing a user authentication process between the client terminal and the portal server.

Referring to FIG. 8, a user authentication process between the client terminal 2 and the portal server 3 will be described.

When a user who has contracted with a company operating the music related service provision system 1 operates the client terminal 2 to turn the client terminal 2 on, the operation input section 20 of the client terminal 2 detects an operation input signal. Alternatively, when a user pushes a particular operation button of the operation input section 20, the operation input section 20 detects an operation input signal. The input processing section 21 transforms the operation input signal into an operation command, and supplies the operation command to the control section 23. The control section 23 therefore starts an authentication request process.

At step SP1, after the control section 23 of the client terminal 2 starts an authentication request process, the control section 23 of the client terminal 2 generates a connection request signal, and then transmits the connection request signal to the portal server 3 via the communication control section 32 and the network interface 33. The connection request signal includes authentication session ID information, which has been temporarily stored in the authentication information storage section 38, and the like.

The authentication session ID information is issued by the portal server 3 each time when a communication connection between the client terminal 2 and the portal server 3 is established to perform various processes such as a user authentication process. The authentication session ID information identifies each communication connection state (i.e., session).

The authentication session ID information has a certain period of validity for a user authentication process and the like. The period of validity starts when the portal server 3 issues it. The period of validity for example is one minute.

In a case in which the client terminal 2 that has already obtained the authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of a user authentication process or the like.

In this case, the authentication information storage section 38 temporarily stores the authentication session ID information, which was issued by the portal server 3 when the communication connection between the client terminal 2 and the portal server 3 was established for the purpose of user authentication process or the like at a time in the past.

When the client terminal 2 transmits a connection request signal, the control section 50 of the portal server 3 at step SP2 receives the connection request signal via the network interface 53 and the communication control section 52. The control section 50 then transmits the authentication session ID information and the like in the connection request signal to the authentication processing section 56.

The authentication processing section 56 under the control of the control section 50 performs, based on the authentication session ID information and the like, an authentication process. This authentication session ID information was received as the connection request signal from the client terminal 2.

As a result, when the authentication processing section 56 determines that a user of the client terminal 2 is not legitimate, the control section 50 transmits authentication error information showing authentication error to the client terminal 2 via the communication control section 52 and the network interface 53. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information from the portal server 3 via the network interface 33 and the communication control section 32. The control section 23 subsequently obtains user ID information, password information, and the like from the authentication information storage section 38, and then transmits the user ID information, the password information, and the like to the portal server 3 via the communication control section 32 and the network interface 33.

At step SP4, the control section 50 of the portal server 3 receives the user ID information, the password information, and the like from the client terminal 2 via the network interface 53 and the communication control section 52, and then supplies the user ID information, the password information, and the like to the authentication processing section 56.

The authentication processing section 56 under the control of the control section 50 performs a user authentication process. In the user authentication process, the authentication processing section 56 checks whether or not the user ID information, the password information, and the like from the client terminal 2 exist in the customer information registered in the customer database section 54.

As a result, when the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the authentication session ID information issued and the like in the authentication information storage section 57.

The control section 50 subsequently transmits the authentication session ID information and the like to the client terminal 2 via the communication control section 52 and the network interface 53. The authentication session ID information and the like were issued by the authentication processing section 56 to the client terminal 2.

At step SP5, the control section 23 of the client terminal 2 receives the authentication session ID information and the like from the portal server 3 via the network interface 33 and the communication control section 32, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 subsequently transmits a page information acquisition request signal along with the authentication session ID information and the like (which were received from the portal server 3 and temporarily stored in the authentication information storage section 38) to the portal server 3 via the communication control section 32 and the network interface 33. The page information acquisition request signal requests the page information from the portal server 3.

At step SP6, the control section 50 of the portal server 3 receives the page information acquisition request signal, the authentication session ID information, and the like from the client terminal 2 via the network interface 53 and the communication control section 52, and then supplies the authentication session ID information, and the like to the authentication processing section 56.

The authentication processing section 56 under the control of the control section 50 then performs a user authentication process. In the user authentication process, the authentication processing section 56 compares the authentication session ID information and the like from the client terminal 2 with the ones temporarily stored in the authentication information storage section 57. The information temporarily stored in the authentication information storage section 57 was issued to the client terminal 2 at step SP4.

At step SP7, when a result of the authentication indicates a fact that a user of the client terminal 2 is legitimate, the authentication processing section 56 determines that the request for page information from the client terminal 2 is legitimate. The authentication processing section 56 then extends the period of validity of the authentication session ID information and the like.

Therefore, the control section 50 reads the page information requested by the user from the page information storage section 55, and transmits the page information, the authentication session ID information, and the like to the client terminal 2 via the communication control section 52 and the network interface 53. The authentication session ID information and the like have their period of validity extended through the authentication processing section 56.

At step SP8, the control section 23 of the client terminal 2 receives the page information, the authentication session ID information and the like from the portal server 3 via the network interface 33 and the communication control section 32. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates, based on the page information from the control section 23, video data of a page containing links to the music data delivery server SV1, the product sales server SV2, and the radio broadcast information delivery server SV3. The page information generation section 36 subsequently supplies the video data to the display control section 24.

The display control section 24 performs digital-to-analog conversion to the video data supplied from the page information generation section 36 to generate an analog video signal. The display control section 24 subsequently supplies the analog video signal to the display section 25 which then displays, based on the analog video signal, an image of a page of the portal server 3.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have their period of validity extended. In this manner, the authentication session ID information and the like temporarily stored at above step SP5 are updated to the ones having their period of validity extended.

(1-7-2) Procedure of User Authentication Process Between Client Terminal 2 and Servers SV1 Through SV3

Figure 9:
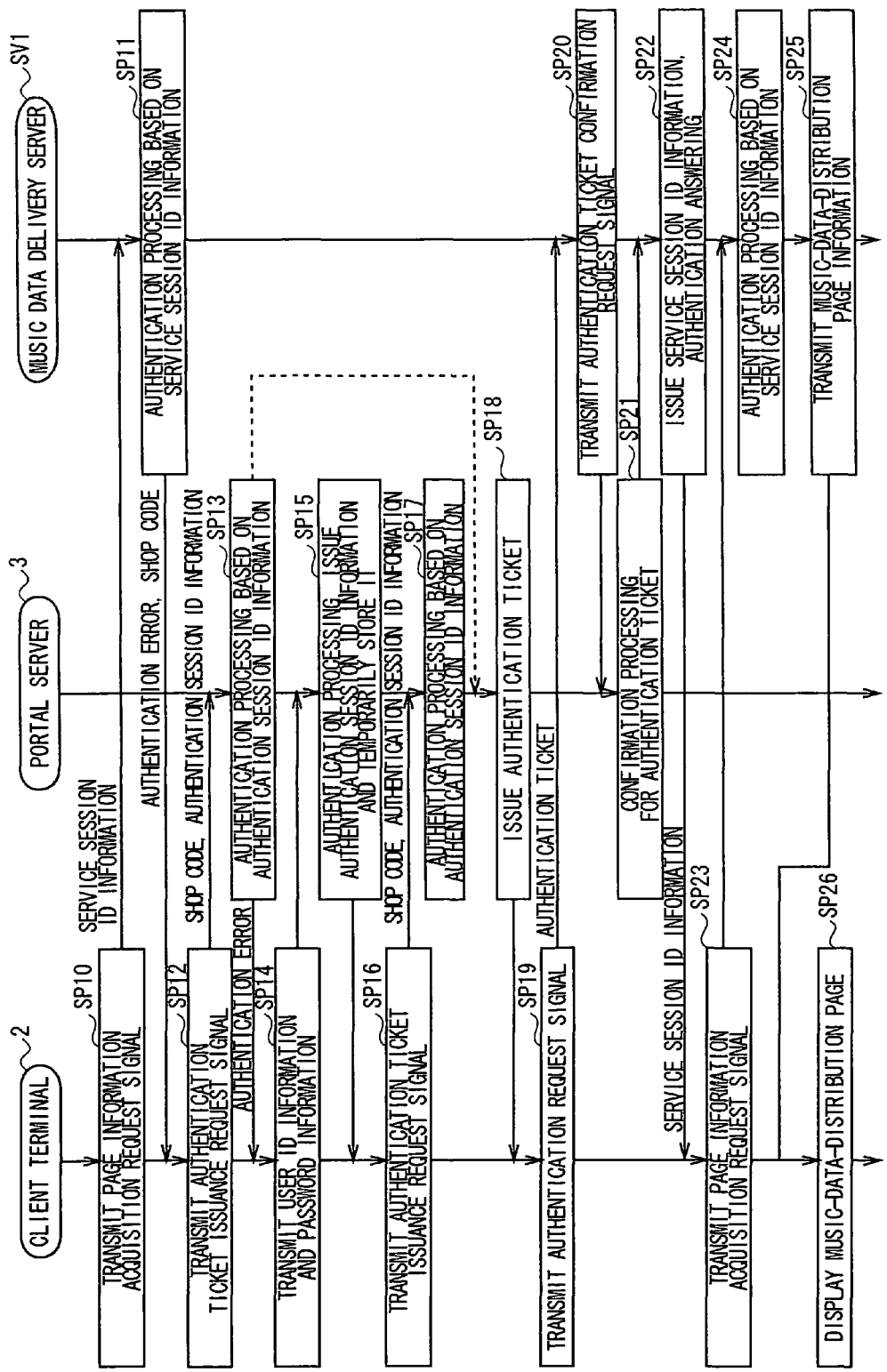
FIG. 9 is a sequence chart showing a user authentication process between the client terminal and the music data delivery server.

Referring to FIG. 9, a user authentication process will be described. The user authentication process is executed between the client terminal 2 and the music data delivery server SV1, the product sales server SV2 and the radio broadcast information delivery server SV3.

In this case, when the client terminal 2 accesses, after acquiring page information from the portal server 3 as described above (FIG. 8), the music data delivery server SV1, the product sales server SV2 and the radio broadcast information delivery server SV3 based on links embedded in the page information, the user authentication process is executed. This user authentication process is also referred to as an "indirect access authentication process".

In addition, when the client terminal 2 directly accesses the music data delivery server SV1, the product sales server SV2 and the radio broadcast information delivery server SV3 based on the URL information and the like previously bookmarked without obtaining page information from the portal server 3, the user authentication process is executed. This user authentication process is also referred to as a "direct access authentication process".

The indirect access authentication process can be performed in any combination of the following: the client terminal 2 and the music data delivery server SV1; the client terminal 2 and the product sales server SV2; and, the client terminal 2 and the radio broadcast information delivery server SV3.

The direct access authentication process also can be performed in any combination of the following: the client terminal 2 and the music data delivery server SV1; the client terminal 2 and the product sales server SV2; and, the client terminal 2 and the radio broadcast information delivery server SV3.

A difference between the indirect access authentication process and the direct access authentication process is a way of acquiring URL information which the client terminal 2 uses to access the music data delivery server SV1, the product sales server SV2 and the radio broadcast information delivery server SV3. The indirect access authentication process and the direct access authentication process perform the same procedure after obtaining the URL information.

Accordingly, for ease of explanation, the following description uses the music data delivery server SV1 which the client terminal 2 accesses. Both the indirect access authentication process and the direct access authentication process will be collectively described as a user authentication process.

At step SP10, the control section 23 of the client terminal 2 transmits a page information acquisition request signal, the service session ID information read from the authentication information storage section 38, and the like to the music data delivery server SV1 through the communication control section 32 and the network interface 33. At this time, the control section 23 of the client terminal 2 uses the URL information that has been embedded in the page information as links, or has been previously bookmarked. The page information acquisition request signal requests the music-data-distribution page information (if the client terminal 2 accesses the product sales server SV2 or the radio broadcast information delivery server SV3, the page information acquisition request signal requests the package-media-sales page information or the on-air-list-information-distribution page information).

Each time when the communication connection between the client terminal 2 and the music data delivery server SV1, the client terminal 2 and the product sales server SV2, or the client terminal 2 and the radio broadcast information delivery server SV3 is established to perform various processes such as the user authentication process, the service session ID information is issued by the connected server SV1, SV2 or SV3. The service session ID information identifies each communication connection state (i.e., session).

The service session ID information has a certain period of validity of the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In a case in which the client terminal 2 that already has the service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of the user authentication process or the like.

In this case, the service session ID information, which is temporarily stored in the authentication information storage section 38, was issued by the music data delivery server SV1, the product sales server SV2 or the radio broadcast information delivery server SV3 when the communication connection between the client terminal 2 and the server SV1, the client terminal 2 and the server SV2 or the client terminal 2 and the server SV3 was established for the purpose of the user authentication process or the like at a time in the past.

At step SP11, the control section 70 of the music data delivery server SV1 receives the page information acquisition request signal, the service session ID information, and the like from the client terminal 2 via the network interface 73 and the communication control section 72. The control section 70 of the music data delivery server SV1 then supplies the service session ID information and the like to the authentication processing section 75.

The authentication processing section 75 under the control of the control section 70 performs the user authentication process. In the user authentication process, the authentication processing section 75 compares the service session ID information and the like from client terminal 2 with those temporarily stored in the authentication information storage section 77.

As a result, if a result of the authentication shows a fact that a user of the client terminal 2 is not legitimate, the authentication processing section 75 determines that the request for music-data-distribution page information from the client terminal 2 is not legitimate. For example, when the service session ID information from the client terminal 2 has expired, the authentication result shows a fact that a user of the client terminal 2 is not legitimate.

The control section 70 subsequently transmits authentication error information showing authentication error, and a shop code identifying the music data delivery server SV1 to the client terminal 2 via the communication control section 72 and the network interface 73, because the authentication processing section 75 determines that a user of the client terminal 2 is not legitimate.

At step SP12, the control section 23 of the client terminal 2 receives the authentication error information and the shop code from the music data delivery server SV1 via the network interface 33 and the communication control section 32. The control section 23 of the client terminal 2 subsequently recognizes that the user is not authenticated as a legitimate user based on the authentication error information, and then temporarily stores the shop code from the music data delivery server SV1 in the authentication information storage section 38.

The control, section 23 subsequently generates an authentication ticket issuance request signal. The authentication ticket issuance request signal requests an issue of an authentication ticket to be used to access the music data delivery server SV1. The control section 23 then transmits the authentication ticket issuance request signal, the shop code of the music data delivery server SV1, the authentication session ID information, which was temporarily stored in the authentication information storage section 38, and the like to the portal server 3 via the communication control section 32 and the network interface 33.

At step SP13, the control section 50 of the portal server 3 receives the authentication ticket issuance request signal, the shop code, the authentication session ID information, and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

As a result, if a result of the authentication shows a fact that a user of the client terminal 2 is not legitimate, the authentication processing section 56 determines that the request for authentication ticket from the client terminal 2 is not legitimate. For example, when the authentication session ID information from the client terminal 2 has expired, the result of authentication shows that a user of the client terminal 2 is not legitimate.

The control section 50 subsequently transmits authentication error information showing authentication error to the client terminal 2 via the communication control section 52 and the network interface 53 because the authentication processing section 56 determines that a user of the client terminal 2 is not legitimate.

Whereas if the result of the authentication shows a fact that a user of the client terminal 2 is legitimate, the authentication processing section 56 determines that the request for authentication ticket from the client terminal 2 is legitimate. For example, when the authentication session ID information from the client terminal 2 has not expired, the result of the authentication shows a fact that a user of the client terminal 2 is legitimate.

In a case in which the result of the authentication from the authentication processing section 56 shows a fact that a user of the client terminal 2 is legitimate, the control-section 50 proceeds to step SP18 as described below.

At step SP14, the control section 23 of the client terminal 2 receives the authentication error information from the portal server 3 via the network interface 33 and the communication control section 32. The control section 23 of the client terminal 2 subsequently reads the user ID information, the password information and the like from the authentication information storage section 38, and then transmits the user ID information, the password information and the like to the portal server 3 via the communication control section 32 and the network interface 33.

At step SP15, the control section 50 of the portal server 3 receives the user ID information, the password information and the like from the client terminal 2 via the network interface 53 and the communication control section 52, and then supplies the user ID information, the password information and the like to the authentication processing section 56.

Therefore, the authentication processing section 56 under the control of the control section 50 performs a user authentication process. In the user authentication process, the authentication processing section 56 checks whether or not the user ID information, the password information and the like from the client terminal 2 exists in the customer information registered in the customer database section 54.

As a result, if a result of the authentication shows that a user of the client terminal 2 is legitimate, the authentication processing section 56 under the control of the control section 50 issues authentication session ID information (portal authentication result information) for the communication connection currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like, which were issued to the client terminal 2 by the authentication processing section 56, to the client terminal 2 via the communication control section 52 and the network interface 53.

At step SP16, the control section 23 of the client terminal 2 receives the authentication session ID information and the like from the portal server 3 via the network interface 33 and the communication control section 32, and then temporarily stores the authentication session ID information and the like in the authentication information storage section 38 through the authentication processing section 37.

The control section 23 then regenerates an authentication ticket issuance request signal which requests an issue of an authentication ticket. The control section 23 subsequently transmits the authentication ticket issuance request signal, the shop code, which was temporarily stored in the authentication information storage section 38, the authentication session ID information, which was temporarily stored at that time, and the like, to the portal server 3 via the communication control section 32 and the network interface 33.

In this embodiment, the client terminal 2 temporarily stores the shop code in the authentication information storage section 38. However, this invention is not limited to this. The client terminal 2 may interchange again the shop code with the portal server 3 while performing the processes of steps SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, the shop code, the authentication session ID information and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

If a result of the authentication shows a fact that a user of the client terminal 2 is legitimate, the authentication processing section 56 determines that the request for authentication tickets from the client terminal 2 is legitimate. For example, in a case in which the authentication session ID information and the like from the client terminal 2 have not expired yet, the authentication result shows a fact that a user of the client terminal 2 is legitimate.

Then, the control section 50 proceeds to step SP18, as a user of the client terminal 2 is authenticated as a legitimate user by the authentication processing section 56.

At step SP18, the authentication processing section 56 under the control of the control section 50 issues an authentication ticket (i.e. the portal authentication result information) and the like based on the shop code and the authentication ticket issuance request signal received from the client terminal 2 by the process of step SP17 described above. The authentication ticket allows the client terminal 2 to access the music data delivery server SV1 corresponding to the shop code.

The authentication processing section 56 under the control of the control section 50 temporarily stores the issued authentication ticket and the like in the authentication information storage section 57, and then extends the period of validity of the authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53.

At step SP19, the control section 23 of the client terminal 2 receives the authentication ticket, the authentication session ID information having its period of validity extended, and the like from the portal server 3 via the network interface 33 and the communication control section 32, and then supplies the authentication session ID information to the authentication processing section 37.

The control section 23 transmits the authentication ticket which was received from the portal server 3, an authentication request signal, and the like to the music data delivery server SV1 via the communication control section 32 and the network interface 33.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored at above-noted step SP16 are updated to those having their period of validity extended.

At step SP20, the control section 70 of the music data delivery server SV1 receives the authentication request signal, the authentication ticket and the like from the client terminal 2 via the network interface 73 and the communication control section 72.

The control section 70 then transmits the authentication ticket, which was received from the client terminal 2, an authentication ticket confirmation request signal, which requests a confirmation of the authentication ticket, and the like to the portal server 3 via the communication control section 72 and the network interface 73.

At step SP21, the control section 50 of the portal server 3 receives the authentication ticket confirmation request signal, the authentication ticket, and the like from the music data delivery server SV1 via the network interface 53 and the communication control section 52. The control section 50 of the portal server 3 then supplies the authentication ticket confirmation request signal, the authentication ticket, and the like to the authentication processing section 56.

In response to the authentication ticket confirmation request signal, the authentication processing section 56 under the control of the control section 50 performs a confirmation process to confirm the authentication ticket received from the music data delivery server SV1. In the confirmation process, the authentication processing section 56 compares the authentication ticket and the like from the music data delivery server SV1 with those temporarily stored in the authentication information storage section 57.

If a result of the confirmation by the authentication processing section 56 shows a fact that the authentication ticket and the like from the music data delivery server SV1 are legitimate, the control section 50 transmits confirmation result information to the music data delivery server SV1 via the communication control section 52 and the network interface 53. In this case, the confirmation result information shows that the authentication ticket and the like are legitimate.

At step SP22, the control section 70 of the music data delivery server SV1 receives the confirmation result information from the portal server 3 via the network interface 73 and the communication control section 72, and then supplies the confirmation result information to the authentication processing section 75.

In response to the confirmation result information, the authentication processing section 75 under the control of the control section 70 issues the service session ID information (i.e. the server authentication result information) for the communication connection currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73.

At step SP23, the control section 23 of the client terminal 2 receives the service session ID information and the like from the music data delivery server SV1 via the network interface 33 and the communication control section 32, and then temporarily stores the service session ID information and the like in the authentication information storage section 38 using the authentication processing section 37.

Therefore, the control section 23 transmits a page information acquisition request signal, which requests the music-data-distribution page information, the service session ID information and the like to the music data delivery server SV1 via the communication control section 32 and the network interface 33. The service session ID information was received from the music data delivery server SV1 and then temporarily stored in the authentication information storage section 38.

At step SP24, the control section 70 of the music data delivery server SV1 receives the page information acquisition request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77. The information temporarily stored in the authentication information storage section 77 was issued to the client terminal 2 by the process of step SP22 described above.

If a result of the authentication shows a fact that a user of the client terminal 2 is legitimate, the authentication processing section 75 determines that the request for music-data-distribution page information from the client terminal 2 is legitimate. For example, when the service session ID information and the like from the client terminal 2 have not expired yet, the result of the authentication shows the fact that a user of the client terminal 2 is legitimate.

Then, the control section 70 proceeds to step SP25, as a user of the client terminal 2 is authenticated as a legitimate user by the authentication processing section 75.

At step SP25, the control section 70 reads out the music-data-distribution page information, which is requested by a user, from the page information storage section 76. The control section 70 also extends the period of validity of the service session ID information and the like issued to the client terminal 2 through the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73.

At step SP26, the control section 23 of the client terminal 2 receives the music-data-distribution page information, the service session ID information having its period of validity extended, and the like from the music data delivery server SV1 via the network interface 33 and the communication control section 32. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their periods of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored by the process of above-noted step SP23 are updated to those having their period of validity extended.

The page information generation section 36 generates video data based on the music-data-distribution page information, and then supplies the video data to the display control section 24.

The display control section 24 performs digital-to-analog conversion to the video data supplied from the page information generation section 36 to generate an analog video signal. The display control section 24 then supplies the analog video signal to the display section 25. The display section 25 displays an image of the music-data-distribution page based on the analog video signal.

(1-7-3) Music Related Service Provision Processes

After completing the user authentication process (FIG. 9) between the client terminal 2 and the music data delivery server SV1, the client terminal 2 and the product sales server SV2, or the client terminal 2 and the radio broadcast information delivery server SV3, the music related service provision process is executed. With reference to FIG. 10 through FIG. 13, the music related service provision process will be described in the following situation: the client terminal 2 receives a music data distribution service through the music-data-distribution page information obtained during the user authentication process from the music data delivery server SV1; the client terminal 2 receives a sales service through the package-media-sales page information obtained during the user authentication process from the product sales server SV2; and the client terminal 2 receives a radio broadcast information distribution service through the on-air-list-information-distribution page information obtained during the user authentication process from the radio broadcast information delivery server SV3.

(1-7-3-1) Music Data Distribution Service Provision Process

Figure 10:
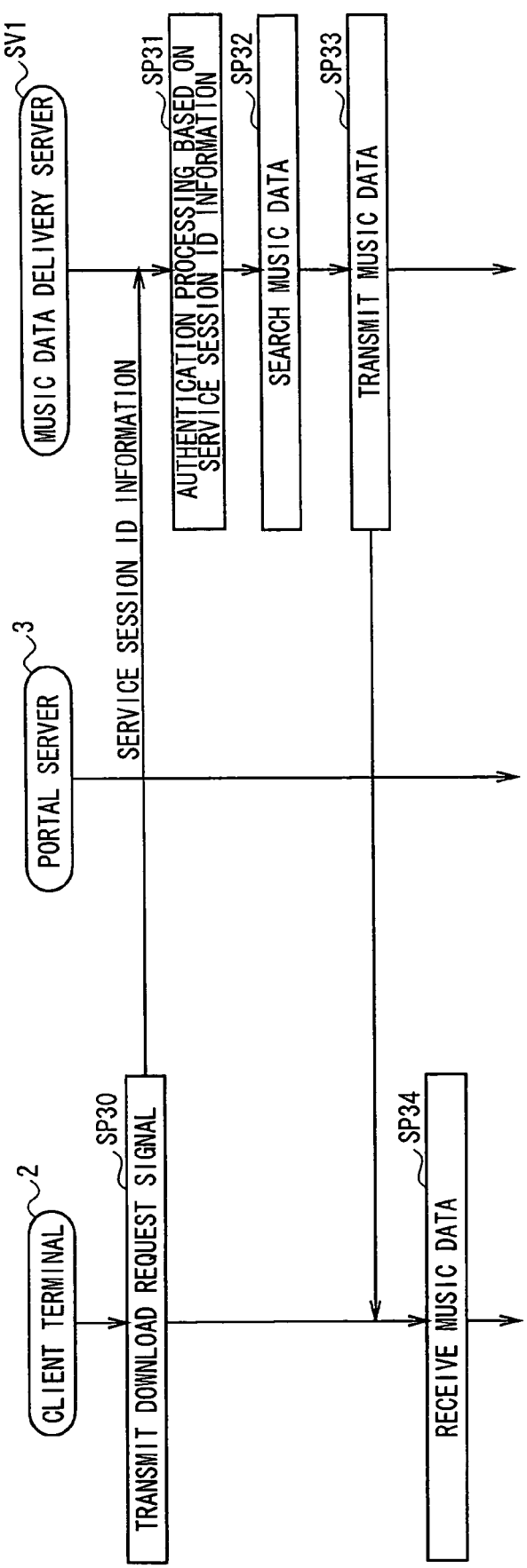
FIG. 10 is a sequence chart showing a music data distribution service provision process.

Referring to FIG. 10, the music data distribution service provision process will be described. In the music data distribution service provision process, the client terminal 2 receives the music data distribution service from the music data delivery server SV1.

At step SP30, if a control command which selects part of the music-data-distribution page displayed as images on the display section 25 is input through the input processing section 21, the control section 23 of the client terminal 2 generates a download request signal, which requests a download of music data a user wants to download.

The control section 23 then transmits the download request signal, the service session ID information, and the like to the music data delivery server SV1 via the communication control section 32 and the network interface 33. The service session ID information was issued by the music data delivery server SV1 and then temporarily stored in the authentication information storage section 38.

At step SP31, the control section 70 of the music data delivery server SV1 receives the download request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77.

If the authentication processing section 75 authenticates a user as a legitimate user, the control section 70 proceeds to step. SP32. In this case, the user has requested a download of music data through the client terminal 2.

At step SP32, the retrieval section 79 performs a search process based on a retrieval key in the download request signal. In the search process, the retrieval section 79 searches a plurality of music data stored in the music data storage section 78 for the music data which corresponds to a retrieval condition indicated by the retrieval key and is the one the user wants to download.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data, which the user wants to download and is found by the retrieval section 79, from the music data storage section 78. The control section 70 then transmits the music data, the service session ID information having its period of validity extended by the authentication processing section 75, and the like to the client terminal 2 via the communication control section 72 and the network interface 73.

At step SP34, the control section 23 of the client terminal 2 receives the music data, which the user wants to download, the service session ID information having its period of validity extended, and the like from the music data delivery server SV1 via the network interface 33 and the communication control section 32. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their period of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

As described above, the client terminal 2 is capable of downloading the music data, which a user wants to acquire, using the music data distribution service provided by the music data delivery server SV1.

(1-7-3-2) Product Sales Service Provision Process

Figure 11:
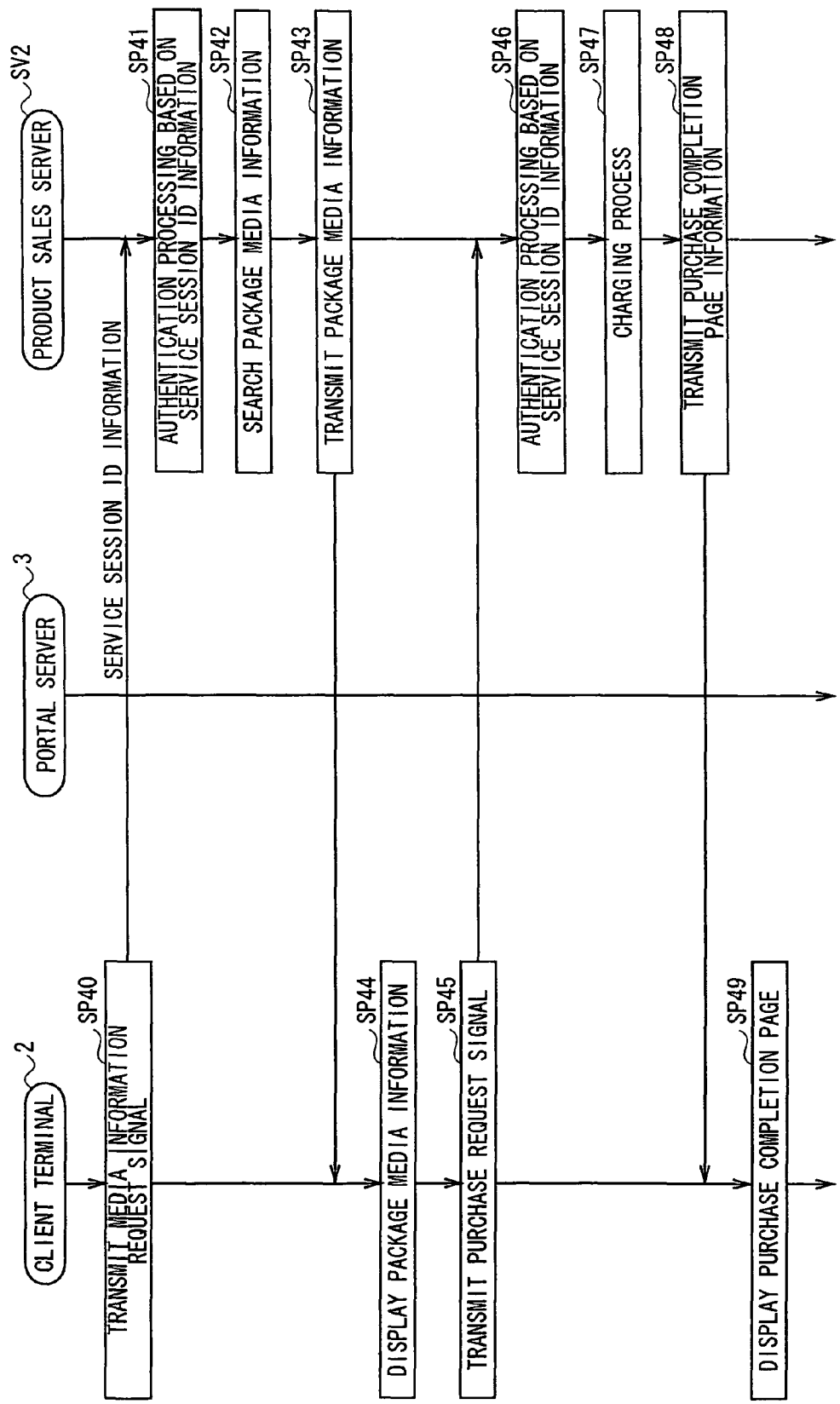
FIG. 11 is a sequence chart showing a product sales service provision process.

Referring to FIG. 11, the product sales service provision process will be described. In the product sales service provision process, the client terminal 2 receives a product sales service from the product sales server SV2.

At step SP40, if a control command which selects part of the package-media-sales page information displayed as an image on the display section 25 is input through the input processing section 21, the control section 23 of the client terminal 2 generates a media information request signal. The media information request signal requests package media information relating to a specific package media corresponding to the control command.

The control section 23 then transmits the media information request signal, the service session ID information and the like to the product sales server SV2 via the communication control section 32 and the network interface 33. The service session ID information was issued by the product sales server SV2 and then temporarily stored in the authentication information storage section 38.

At step SP41, the control section 90 of the product sales server SV2 receives the media information request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

If the authentication processing section 95 authenticates a user as a legitimate user, the control section 90 proceeds to step SP42. In this case, the user has requested the package media information relating to the package media using the client terminal 2.

At step SP42, the retrieval section 99 performs, based on a retrieval key in the media information request signal, a search process. In the search process, the retrieval section 99 searches a plurality of pieces of package media information stored in the package media information storage section 98 for a certain piece of package media information corresponding to a retrieval-condition indicated by the retrieval key.

When the retrieval section 99 has the piece of package media information found, the control section 90 extends the period of validity of the service session ID information and the like issued to the client terminal 2 through the authentication processing section 95, and then proceeds to step SP43.

At step SP43, the control section 90 reads out the package media information, which was found by the retrieval section 99, from the package media information storage section 98. The control section 90 then transmits the package media information, the service session ID information having its period of validity extended by the authentication processing section 95, and the like to the client terminal 2 via the communication control section 92 and the network interface 93.

At step SP44, the control section 23 of the client terminal 2 receives the package media information, the service session ID information having its period of validity extended, and the like from the product sales server SV2 via the network interface 33 and the communication control section 32, and then supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the package media information supplied from the control section 23, video data. The page information generation section 36 then transforms the video data into an analog video signal through the display control section 24, and then supplies the analog video signal to the display section 25.

After the display section 25 starts to display an image of the package media information based on the analog video signal, the control section 23 proceeds to step SP45.

At step SP45, if a control command that requests a purchase of the package media corresponding to the package media information displayed as an image on the display section 25 is input through the input processing section 21, the control section 23 generates, in response to the control command, a purchase request signal which requests the purchase of the package media.

The control section 23 then transmits the purchase request signal, the service session ID information having its period of validity extended, and the like to the product sales server SV2 via the communication control section 32 and the network interface 33. The service session ID information was received from the product sales server SV2 and then temporarily stored in the authentication information storage section 38.

At step SP46, the control section 90 of the product sales server SV2 receives the purchase request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

As a result, if the authentication processing section 95 authenticates the user, who requests the purchase of the package media through the client terminal 2, as a legitimate user, the control section 90 proceeds to step SP47.

At step SP47, the control section 90 performs a product sales process. In the product sales process, the control section 90 executes a procedure to deliver the requested package media to the user of the client terminal 2. The control section 90 also transmits fee-charging information to the fee-charging server SV5 via the communication control section 92 and the network interface 93. The fee-charging information is used to charge the user a fee for the purchased package media. Therefore, the fee-charging server SV5 performs a fee-charging process to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing a completion of the purchase of package media, the service session ID information having its period of validity extended by the authentication processing section 95, and the like to the client terminal 2 via the communication control section 92 and the network interface 93.

At step SP49, the control section 23 of the client terminal 2 receives the purchase completion page information, the service session ID information having its period of validity extended, and the like from the product sales server SV2 via the network interface 33 and the communication control section 32, and then supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the purchase completion page information supplied from the control section 23, video data. The page information generation section 36 subsequently transforms the video data into an analog video signal through the display control section 24, and then supplies the analog video signal to the display section 25.

Therefore, the control section 23 can display, based on the analog video signal, an image of the purchase completion page on the display section 25.

As described above, the client terminal 2 allows a user to purchase the package media he/she wants using the sales services provided by the product sales server SV2.

(1-7-3-3) On-Air-List Information Distribution Service Provision Process

Figure 12:
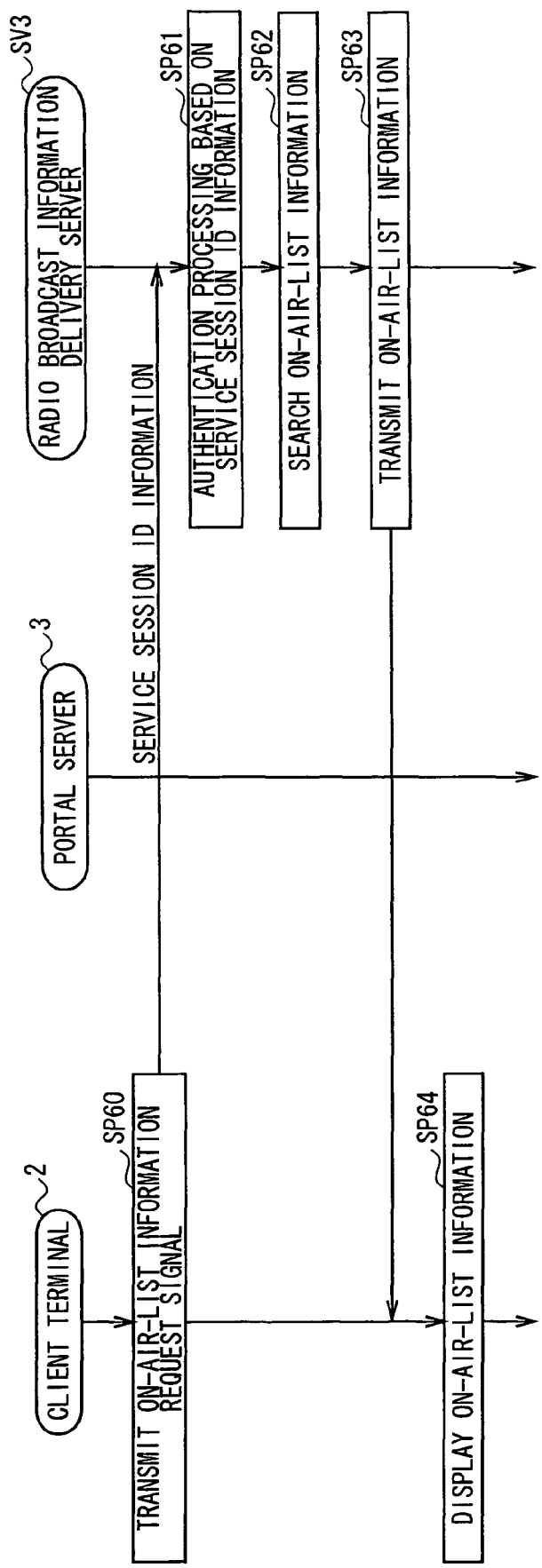
FIG. 12 is a sequence chart showing a radio broadcast information (on-air list information) distribution service provision process (1).

With reference to FIG. 12, a radio broadcast information distribution service provision process will be described. In the radio broadcast information distribution service provision process, the client terminal 2 receives especially an on-air-list information distribution service as the radio broadcast information distribution service from the radio broadcast information distribution delivery server SV3.

At step SP60, a user input a retrieval key in an input box disposed on the on-air-list-information-distribution page displayed as an image on the display section 25. The retrieval key, which is used to retrieve the on-air-list information, is a character string corresponding to the on-air-list information the user wants to obtain. At this time, a control command corresponding to the character string is input through the input processing section 21. The control section 23 of the client terminal 2 generates, based on the control command input, an on-air-list information request signal which requests a download of the on-air-list information the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33. The service session ID information was issued by the radio broadcast information delivery server SV3.

At step SP61, the control section 110 of the radio broadcast information delivery server SV3 receives the on-air-list information request signal, the service session ID information and the like from the client terminal 2 via the network interface 113 and the communication control section 112, and then supplies the service session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user, who requests the on-air-list information using the client terminal 2, as a legitimate user, the control section 110 proceeds to step SP62.

At step SP62, the retrieval section 118 performs, based on the retrieval key in the on-air-list information request signal, a search process in which the retrieval section 118 searches the whole on-air-list information in the on-air-list information storage section 117 for a certain part of the on-air-list information which meets a retrieval condition indicated by the retrieval key to obtain the desired on-air-list information.

When the retrieval section 118 has the on-air-list information found, the control section 110 extends the period of validity of the service session ID information and the like issued to the client terminal 2 through the authentication processing section 115. The control section 110 then proceeds to step SP63.

At step SP63, the control section 110 reads out the on-air-list information, which was found by the retrieval section 118, from the on-air-list information storage section 117. The control section 110 then transmits the on-air-list information, the service session ID information having its period of validity extended by the authentication processing section 115, and the like to the client terminal 2 via the communication control section 112 and the network interface 113.

At step SP64, the control section 23 of the client terminal 2 receives the on-air-list information, the service session ID information having its period of validity extended, and the like from the radio broadcast information delivery server SV3 via the network interface 33 and the communication control section 32, and then supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the on-air-list information supplied from the control section 23, video data. The page information generation section 36 then transforms the video data into an analog video signal through the display control section 24, and then supplies the analog video signal to the display section 25. The display section 25 therefore displays, based on the analog video signal, an image or the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
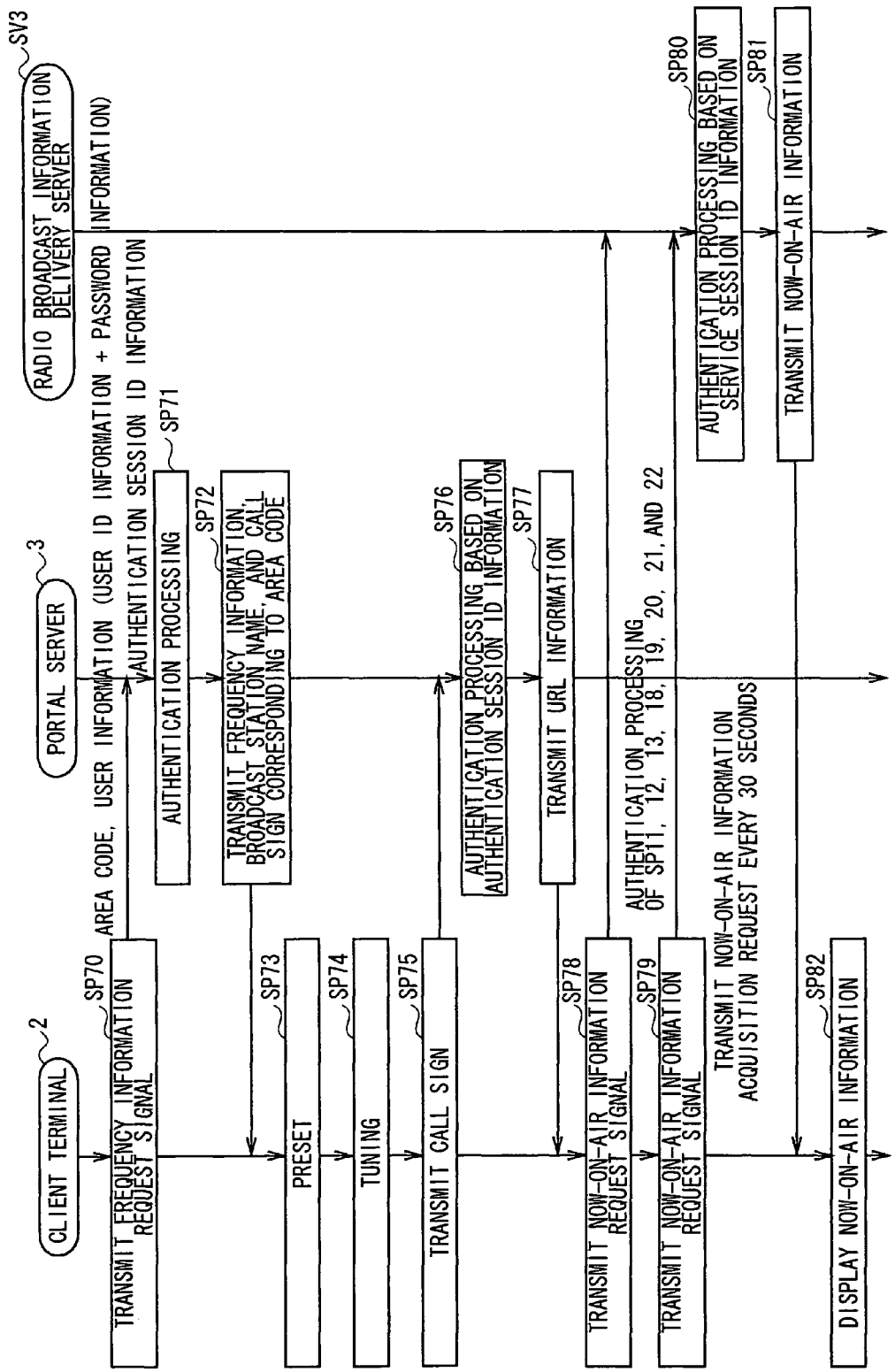
FIG. 13 is a sequence chart showing a radio broadcast information (now-on-air information) distribution service provision process (2).

Referring to FIG. 13, the radio broadcast information distribution service provision process will be described. In the radio broadcast information distribution service provision process, the client terminal 2 receives especially the now-on-air information distribution service as the radio broadcast information distribution service from the radio broadcast information delivery server SV3.

There is a plurality of radio broadcast information delivery servers SV3 providing the now-on-air information, each of which corresponds to a different radio station (call sign).

At initial state, the client terminal 2 may not store the URL information of those radio broadcast information delivery servers SV3 corresponding to radio stations.

With the radio broadcast information distribution service provision process described below, the following describes a situation in which the portal server 3 manages the URL information of each radio broadcast information delivery server SV3. Specifically, in this case, the portal server 3 manages a plurality of pieces of URL information, each of which corresponds to a call sign of a radio station.

In addition, with the radio broadcast information distribution service provision process described below, the client terminal 2 does not have the authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits the user ID information, the password information, and the like to the portal server 3.

At step SP70, if an operation command which requests an auto-preset of broadcast frequencies of radio stations is input through the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33. The frequency information request signal requests the frequency information about broadcast frequencies of radio stations from which the client terminal 2 can receive their broadcasts.

At step SP71, the control section 50 of the portal server 3 receives the frequency information request signal, the area code, the user ID information, the password information and the like from the client terminal 2 via the network interface 53 and the communication control section 52, and then supplies the user ID information and the password information received from the client terminal 2 to the authentication processing section 56.

The authentication processing section 56 under the control of the control section 50 performs a user authentication process. In the user authentication process, the authentication processing section 56 compares the user ID information, the password information and the like received from the client terminal 2 with the customer information registered in the customer database section 54.

As a result, if the authentication processing section 56 authenticates a user of the client terminal 2 as a legitimate user, the authentication processing section 56 determines that the request for frequency information from the client terminal 2 is legitimate. Therefore, the authentication processing section 56 under the control of the control section 50 issues authentication session ID information and the like. The authentication session ID information identifies the communication connection currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates the user as a legitimate user.

At step SP72, the control section 50 retrieves, based on the area code from the client terminal 2, the frequency information, radio station names and call signs corresponding to the area code from a list which is stored in the frequency information storage section 58 and includes a plurality of pieces of frequency information, radio station names and call signs. The control section 50 then reads out the retrieved frequency information, radio station names and call signs in list format.

The control section 50 subsequently transmits the frequency information, radio station names and call signs read from the frequency information storage section 58 in list format, along with the authentication session ID information and the like, to the client terminal 2 via the communication control section 52 and the network interface 53. The authentication session ID information was issued to the client terminal 2 by the authentication processing section 56 at above-noted step SP71.

At step SP73, the control section 23 of the client terminal 2 receives the list, which includes the frequency information, the radio station names and the call signs, from the portal server 3 via the network interface 33 and the communication control section 32. The control section 23 of the client terminal 2 also receives the authentication session ID information and the like from the portal server 3 via the network interface 33 and the communication control section 32. The control section 23 of the client terminal 2 then supplies the authentication session ID information and the like received from the portal server 3 to the authentication processing section 37. The control section 23 of the client terminal 2 also supplies the list, which includes the frequency information, the radio station names and the call signs, to the display control section 24.

The authentication processing section 37 under the control of the control section 23 temporarily stores the authentication session ID information and the like received from the portal server 3 in the authentication information storage section 38.

The display control section 24 supplies the list, which includes the frequency information, the radio station names and the call signs, to the display section 25. The display section 25 therefore displays the list.

At this time, based a selection command input through the input processing section 21, the control section 23 stores the selected frequency information, radio station name and call sign in the storage medium 29 as a preset, and then proceeds to step SP74.

At step SP74, in response to a tuning control command input through the input processing section 21, the control section 23 controls, based on the tuning control command input, the tuner section 31 to extract, from radio waves, a radio broadcast signal of a radio broadcast transmitted in a broadcast frequency corresponding to the tuning control command.

The tuner section 31 therefore extracts the radio broadcast signal in the broadcast frequency from the radio waves received by the broadcast signal reception section 30. The tuner section 31 then performs a prescribed reception process such as decoding to generate audio data, and then supplies the audio data to the audio control section 26.

The audio control section 26 therefore transforms the audio data supplied from the tuner section 31 into an analog audio signal, and supplies the analog audio signal to the speaker 27 which then outputs audio of the selected radio program.

At step SP75, the radio broadcasting display control section 39 under the control of the control section 23 reads a call sign from the storage-medium 29. In this case, the call sign stored in the storage medium 29 has been associated with the frequency information showing the broadcast frequency corresponding to the above-noted tuning control command. The radio broadcasting display control section 39 then transmits the call sign, the authentication session ID information temporarily stored in the authentication information storage section 38, and the like to the portal server 3 via the communication control section 32 and the network interface 33.

At step SP76, the control section 50 of the portal server 3 receives the call sign, the authentication session ID information and the like from the client terminal 2 via the network interface 53 and the communication control section 52, and supplies the authentication session ID information and the like to the authentication processing section 56.

The authentication processing section 56 under the control of the control section 50 performs a user authentication process. In the user authentication process, the authentication processing section 56 compares the authentication session ID information and the like received from the client terminal 2 with those temporarily stored in the authentication information storage section 57.

As a result, if the authentication processing section 56 authenticates the user, who transmits the call sign using the client terminal 2, as a legitimate user, the control section 50 proceeds to step SP77. In this case, since the authentication session ID information and the like received from the client terminal 2 have not expired yet, the authentication processing section 56 authenticates the user as a legitimate user.

At step SP77, the control section 50 performs, based on the call sign from the client terminal 2, a retrieving process in which the control section 50 retrieves a piece of URL information corresponding to the call sign from among a plurality of pieces of URL information stored in the URL storage section 59.

The control section 50 also extends the period of validity of the authentication session ID information and the like issued to the client terminal 2 using the authentication processing section 56.

The control section 50 subsequently reads the retrieved URL information from the URL storage section 59, and then transmits the URL information, the authentication session ID information having its period of validity extended by the authentication processing section 56, and the like to the client terminal 2 via the communication processing section 52 and the network interface 53.

At step SP78, the control section 23 of the client terminal 2 receives the URL information, the authentication session ID information having its period of validity extended, and the like from the portal server 3 via the network interface 33 and the communication control section 32, and then supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like, which have their period of validity extended, were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored are updated to those having their period of validity extended.

The radio broadcasting display control section 39 under the control of the control section 23 associates the URL information supplied from the control section 23 with the call sign stored in the storage medium 29, and then temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33. In this case, the radio broadcasting display control section 39 transmits, based on the URL information temporarily stored in the storage medium 29 or the like, the now-on-air information request signal. The service session ID information stored in the authentication information storage section 38 was received from the radio broadcast information delivery server SV3.

By the way, in the radio broadcast information distribution service provision process, the process of step SP78 corresponds to the process of step SP10 in FIG. 9. In the process of step SP78, the now-on-air information request signal, the service session ID information and the like are transmitted from the client terminal 2 to the radio broadcast information delivery server SV3.

Accordingly, in the radio broadcast information distribution service provision process, after the process of step SP78, the client terminal 2, the radio broadcast information delivery server SV3 and the portal server 3 performs the same user authentication process as the one made up of step SP11 through SP13 and step SP18 through SP22, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits, based on the URL information temporarily stored in the storage medium 29 or the like, the now-on-air information request signal, the service session ID information temporarily stored in the authentication information storage section 38, and the like to the radio broadcast information delivery server SV3 via the communication control section 32 and the network interface 33. The service session ID information, which was temporarily stored in the authentication information storage section 38, was received from the radio broadcast information delivery server SV3.

At step SP80, the control section 110 of the radio broadcast information delivery server SV3 receives the now-on-air information request signal, the service session ID information and the like from the client terminal 2 via the network interface 113 and the communication control section 112, and then supplies the received authentication session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user of the client terminal 2 as a legitimate user, the authentication processing section 115 determines that the request for now-on-air information from the client terminal 2 is legitimate.

After the authentication processing section 115 authenticates the user of the client terminal 2 as a legitimate user, the control section 110 extends the period of validity of the service session ID information and the like issued to the client terminal 2 through the authentication processing section 115, and then proceeds to step SP81.

At step SP81, the control section 110 reads now-on-air information from the now-on-air information storage section 119, and then transmits the now-on-air information, the service session ID information having its period of validity extended by the authentication processing section 115, and the like to the client terminal 2 via the communication control section 112 and the network interface 113.

At step SP82, the control section 23 of the client terminal 2 receives the now-on-air information, the service session ID information having its period of validity extended and the like from the radio broadcast information delivery server SV3 via the network interface 33 and the communication control section 32, and then supplies the service session ID information and the like to the authentication processing section 37. The control section 23 of the client terminal 2 also supplies the now-on-air information to the radio broadcasting display control section 39

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The radio broadcasting display control section 39 supplies the now-on-air information supplied from the control section 23 to the display section 25 via the display control section 24. The display section 25 therefore displays the now-on-air information relating to the radio program currently received.

After that, in the radio broadcast information distribution service provision process, the client terminal 2 repeats a request process of now-on-air information (step SP79) at a certain interval of time. When receiving the request from the client terminal 2, the radio broadcast information delivery server SV3 sequentially performs the process of step SP80 and SP81.

In this manner, the client terminal 2 can update the now-on-air information displayed on the display section 25 every second. The now-on-air information includes the following items: a title of a radio program currently received by the client terminal 2; a start time of the radio program; an end time of the radio program; an artist name and title of music currently played in the radio program; and a start time of the broadcast of the music.

(1-8) Hardware Circuit Block Configuration of Client Terminal 2

(1-8-1) Circuit Configuration

The hardware configuration of the client terminal 2 will be described using hardware circuit blocks. In the hardware configuration of the client terminal 2 with the hardware circuit blocks, a part of capabilities of the client terminal 2 is a process performed by software modules as described below.

Figure 14:
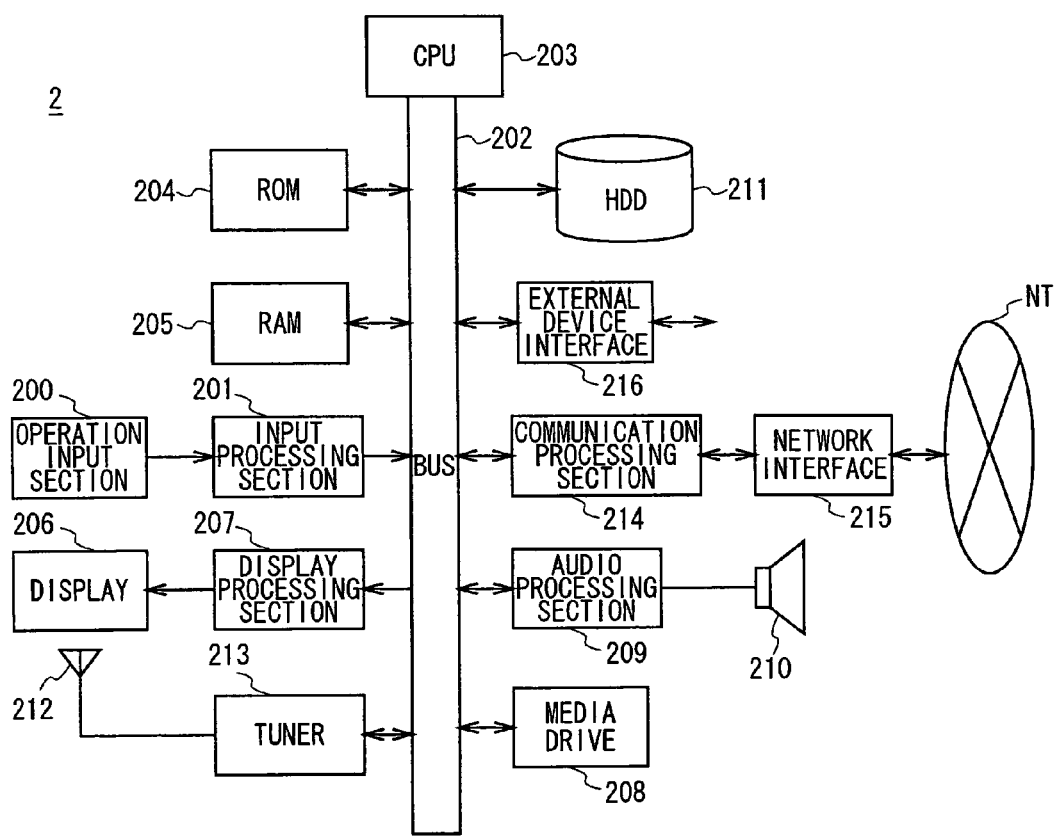
FIG. 14 is a block diagram showing the hardware configuration of a client terminal using hardware circuit blocks.

Referring to FIG. 14, the client terminal 2 has an operation input section 200 on its housing or a remote control (not shown). The operation input section 200 provides various operation buttons. When a user operates the operation input section 200, the operation input section 200 detects the operation and then supplies an operation input signal corresponding to the operation to an input processing section 201.

The input processing section 201 performs a prescribed process to the supplied operation input signal to transform the operation input signal into an operation command. The input processing section 201 then supplies the operation command via a bus 202 to a CPU (Central Processing Unit) 203.

A ROM (Read Only Memory) 204 previously has stored various programs, such as a basic program and an application program. The CPU 203 reads these programs from the ROM 204 via the bus 202, and loads these programs onto a RAM (Random Access Memory) 205. The CPU 203 takes overall control of the client terminal 2 based on the programs, and performs, in response to the operation command supplied from the input processing section 201, a prescribed computation process and various processes.

For example, a display 206 is a display device such as a liquid crystal display. The display 206 may be directly or externally disposed on the housing.

A result of process by the CPU 203 and various video data are supplied to the display 206 via a display processing section 207 as an analog video signal. The display 206 displays an image based on the analog video signal.

For example, CDs and "MEMORY STICK (Registered Trademark of Sony. Corporation)" store content data. The MEMORY STICK includes a flash memory covered with an exterior case. A media drive 208, for example, reads the content data from the CD and the "MEMORY STICK (Registered Trademark of Sony Corporation)", and then plays back the content data. Alternatively, the media drive 208 records the content data, which is to be recorded, on the CD or the "MEMORY STICK (Registered Trademark of Sony Corporation)".

When the media drive 208 reads video data (content data) from the CDs or the "MEMORY STICK (Registered Trademark of Sony Corporation)", the media drive 208 supplies the video data to the display processing section 207 via the bus 202.

When the media drive 208 reads audio data (content data) from the CDs or "MEMORY STICK (Registered Trademark of Sony Corporation)", the media drive 208 supplies the audio data to an audio processing section 209.

The display processing section 207 performs digital-to-analog conversion to the video data, which was supplied via the bus 202, to generate an analog video signal. The display processing section 207 then supplies the analog video signal to the display 206. The display 206 displays an image based on the analog video signal.

The audio processing section 209 performs digital-to-analog conversion to the audio data, which was supplied via the bus 202, to generate an analog audio signal. The audio processing section 209 then supplies the analog audio signal to a 2-channel speaker 210 which therefore outputs sound on stereo based on the analog audio signal.

In addition, the CPU 203 is able to supply the content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files from the hard disk drive 211 as content data.

When the CPU 203 reads video data (content data) from the hard disk drive 211, the CPU 203 supplies the video data to the display processing section 207 via the bus 202.

When the CPU 203 reads audio data (content data) from the hard disk drive 211, the CPU 203 supplies the audio data to the audio processing section 209.

An antenna 212 receives radio broadcast waves from radio stations. The antenna 212 then supplies the radio broadcast waves to a tuner 213 equivalent to an AM/FM tuner.

For example, a user selects a certain radio station through the operation input section 200. The tuner 213 under the control of the CPU 203 extracts, from the radio broadcast waves received by the antenna 212, a radio broadcast signal of the broadcast frequency corresponding to the selected radio station. The tuner 213 then performs a prescribed reception process to the radio broadcast signal to generate audio data, and then supplies the audio data via the bus 202 to the audio processing section 209.

The audio processing section 209 transforms the audio data supplied from the tuner 213 into an analog audio signal, and then supplies the analog audio signal to the speaker 210 which therefore outputs sound of a radio program broadcast from a radio station. This allows a user to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215. The CPU 203 therefore can access the portal server 3 and other servers SV1 through SV4 on the network NT, and interchange various data with the portal server 3 and other servers SV1 through SV4.

(1-8-2) Configuration of Program Modules

Figure 15:
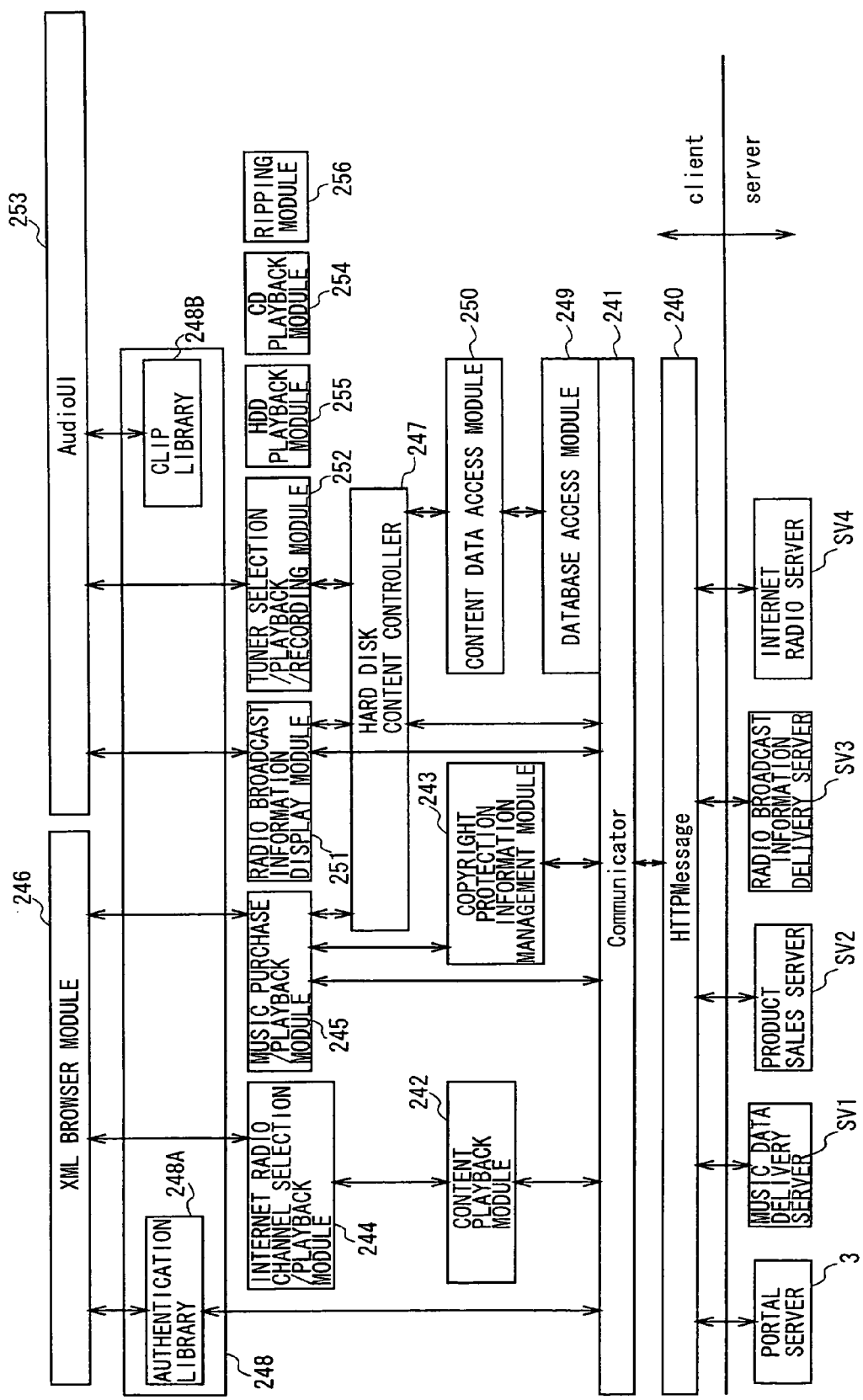
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchange with the portal server 3 and other servers SV1 through SV4.

An HTTP (Hyper Text Transfer Protocol) message program 240 interchanges with the portal server 3 and other servers SV1 through SV4 in HTTP communication. A communicator program 241 interchanges data with the HTTP message program 240.

A content playback module 242 and a copyright protection information management module 243 are disposed above the communicator program 241. The content playback module 242 interprets the codec of contents, and reproduces them. The copyright protection information management module 243 deals with information relating to copyright protection. An Internet radio channel selection/playback module 244 and a music purchase/playback module 245 are disposed on the content playback module 242 and the copyright protection information management module 243 respectively. The Internet radio channel selection/playback module 244 selects channels of Internet radio and plays the selected channels. The music purchase/playback module 245 controls the purchase of music and the playback of demo music.

The Internet radio channel selection/playback module 244 and the music purchase/playback module 245 perform a playback process to generate audio data. The audio data is transferred to the audio processing section 209 to output audio from the speaker 210.

A XML browser 246 is disposed above the Internet radio channel selection/playback module 244 and the music purchase/playback module 245. The XML browser 246 interprets XML files received from various servers, and then displays images on the display 206.

For example, a user selects a piece of music through the XML browser 246. The music purchase/playback module 245 therefore performs a purchasing process for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/playback/recording module 252 are disposed above the hard disk content controller 247. The radio broadcast information display module 251 performs processes for displaying a title and artist name of music broadcast from radio stations. The tuner selection/playback/recording module 252 selects radio stations. The tuner selection/playback/recording module 252 also records content data (music) received from a radio station on the hard disk drive 211.

For example, a user selects a radio station through an audio user interface 253 to receive music from the radio station. The received music is supplied via the content data access module 250 to the hard disk drive 211 to stores it in the hard disk drive 211.

The tuner selection/playback/recording module 252 performs playback processes to generate audio data (content data). The audio data is supplied to the audio processing section 209 to output audio from the speaker 210.

The radio broadcast information display module 251 uses the tuner selection/playback/recording module 252 to receive radio broadcast information from the radio broadcast information delivery server SV3 via the HTTP message program 240. For example, the received radio broadcast information is now-on-air information about a title and artist name of music currently broadcast by a radio station. The radio broadcast information display module 251 then transmits the information via the audio user interface (UI) 253 to the display 206 which displays the information.

The radio broadcast information, which was transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD playback module 254 controls the media drive 208 to play back CDs.

Audio data played back from CDs by the CD playback module 254 are transferred to the audio processing section 209 to output audio from the speaker 210.

An HDD playback module 255 connects with the hard disk content controller 247 and the copyright protection information management module 243 (the connection is not shown here).

The HDD playback module 255 under the control of the hard disk content controller 247 reads audio data (content data) from the hard disk drive 211. The HDD playback module 255 then plays back the audio data based on copyright management information supplied from the copyright protection information management module 243.

In addition, audio data, which was played by the HDD playback module 255 based on the copyright management information, is supplied to the audio processing section 209 which then outputs audio from the speaker 210.

A ripping module 256 connects with the hard disk content controller 247 and the copyright protection information management module 243 (the connection is not shown here).

The ripping module 256 controls the CD playback module 254, the copyright protection information management module 243, and the hard disk content controller 247 to store (i.e., rip) audio data played back from CDs by the CD playback module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can provide the same function as the communication control section 32 of the client terminal 2 (FIG. 2) does.

The content playback module 242 can provide the same function as the encoder/decoder section 34 of the client terminal 2 (FIG. 2) does.

The copyright protection information management module 243 can provide the same function as the copyright management section 35 of the client terminal 2 (FIG. 2) does.

The Internet radio channel selection/playback module 244 can provide the same function as the control section 23 and audio control section 26 of the client terminal 2 (FIG. 2) do.

The music purchase/playback module 245 can provide the same function as the control section 23 and audio control section 26 of the client terminal 2 (FIG. 2) do.

The XML browser module 246 can provide the same function as the input processing section 21 and page information generation section 36 of the client terminal 2 (FIG. 2) do.

The hard disk content controller 247, the database access module 249, and the content data access module 250 can provide the same function as the control section 23 of the client terminal 2 (FIG. 2) does.

The authentication library 248A of the library 248 can provide the same function as the authentication processing section 37 and the authentication information storage section 38 of the client terminal 2 (FIG. 2) do.

The clip library 248B of the library 248 can provide the same function as the control section 23 of the client terminal 2 (FIG. 2) does.

The radio broadcast information display module 251 can provide the same function as the radio broadcasting display control section 39 of the client terminal 2 (FIG. 2) does.

The tuner selection/playback/recording module 252 can provide the same function as the control section 23, audio control section 26 and tuner section 31 of the client terminal 2 (FIG. 2) do.

The audio user interface 253 can provide the same function as the input processing section 21, control section 23 and display control section 24 of the client terminal 2 (FIG. 2) do.

The CD playback module 254 can provide the same function as the audio control section 26 and external recording media recording and reproducing section 28 of the client terminal 2 (FIG. 2) do.

The HDD playback module 255 can provide the same function as the control section 23 and audio control section 26 of the client terminal 2 (FIG. 2) do.

The ripping module 256 can provide the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted program modules.

(1-9) Hardware Circuit Block Configuration of Each Server

The portal server 3, the music data delivery server SV1, the product sales server SV2, and the radio broadcast information delivery server SV3 includes hardware circuit blocks. The hardware configuration of these servers 3, SV1, SV2, and SV3 will be described.

In a case in which the portal server 3, the music data delivery server SV1, the product sales server SV2, and the radio broadcast information delivery server SV3 includes hardware circuit blocks, these servers 3, SV1, SV2, and SV3 can use software to provide various kinds of functions. Accordingly, in this case, each server 3, SV1, SV2, and SV3 has the same hardware configuration.

Figure 16:
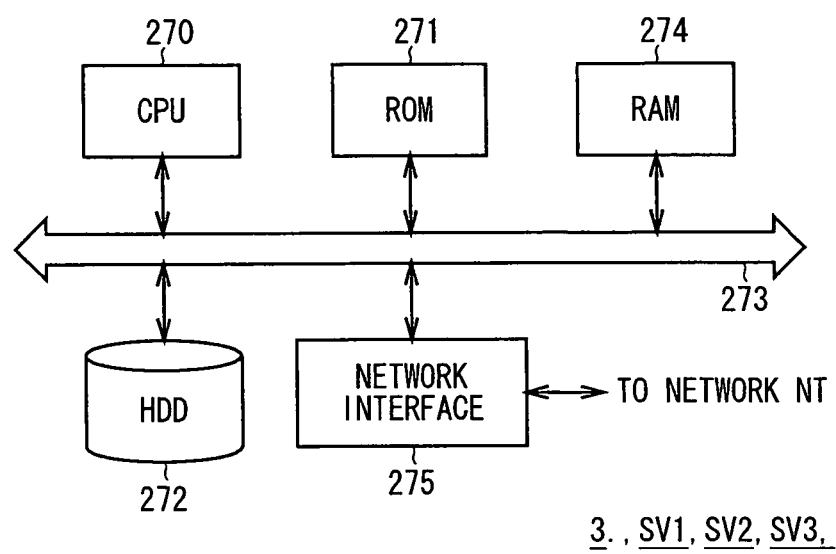
FIG. 16 is a block diagram showing the hardware configuration of servers using hardware circuit blocks.

Referring to FIG. 16, the basic hardware configuration of a server including hardware circuit blocks will be described. This configuration can be applied to any one of these servers: the portal server 3, the music data delivery server SV1, the product sales server SV2, and the radio broadcast information delivery server SV3.

The server has a CPU 270. The CPU 270 takes overall control of the server. A ROM 271 or a hard disk drive 272 stores various kinds of programs such as basic programs and application programs. The CPU 270 loads these programs onto a RAM 274 via a bus 273 and performs various kinds of processes based on the programs.

The hard disk drive 272 temporarily or permanently stores various kinds of data and information including page information to be published. The hard disk drive 272 may have a database on its hard disk to store various kinds of registration information such as customer information.

The CPU 270 reads from the hard disk drive 272 various kinds of data, information and registration information to perform various kinds of processes using them.

A network interface 275 connects with the client terminal 2 and various kinds of servers via the network NT to interchange various kinds of data and information.

In the server, the CPU 270 essentially performs various kinds of processes using various kinds of programs stored in the ROM 271 or the hard disk drive 272.

Therefore, this server's CPU 270 can perform the same functions as the control section 50, communication control section 52, and authentication processing section 56 of the portal server 3 illustrated by FIG. 4, if the programs stored in the ROM 271 or the hard disk drive 272 are selected properly in dependence upon the functions provided by the portal server 3 (FIG. 4). And this server's hard disk drive 272 can work as the customer database section 54, page information storage section 55, authentication information storage section 57, frequency information storage section 58, and URL storage section 59 of the portal server 3 (FIG. 4). By the way, the portal server 3 illustrated by FIG. 4 includes functional circuit blocks.

This server's CPU 270 also can perform the same functions as the control section 70, communication control section 72, authentication processing section 75, and retrieval section 79 of the music data delivery server SV1 illustrated by FIG. 5, if the programs stored in the ROM 271 or the hard disk drive 272 are selected properly in dependence upon the functions provided by the music data delivery server SV1 (FIG. 5). And this server's hard disk drive 272 can work as the customer database section 74, page information storage section 76, authentication information storage section 77, and music data storage section 78 of the music data delivery server SV1 (FIG. 5). By the way, the music data delivery server SV1 illustrated by FIG. 5 includes functional circuit blocks.

This server's CPU 270 also can perform the same functions as the control section 90, communication control section 92, authentication processing section 95, and retrieval section 99 of the product sales server SV2 illustrated by FIG. 6, if the programs stored in the ROM 271 or the hard disk drive 272 are selected properly in dependence upon the functions provided by the product sales server SV2 (FIG. 6). And this server's hard disk drive 272 can work as the customer database section 94, page information storage section 96, authentication information storage section 97, and package media information storage section 98 of the product sales server SV2 (FIG. 6). By the way, the product sales server SV2 illustrated by FIG. 6 includes functional circuit blocks.

This server's CPU 270 also can perform the same functions as the control section 110, communication control section 112, authentication processing section 115, and retrieval section 118 of the radio broadcast information delivery server SV3 illustrated by FIG. 7, if the programs stored in the ROM 271 or the hard disk drive 272 are selected properly in dependence upon the functions provided by the radio broadcast information delivery server SV3 (FIG. 7). And this server's hard disk drive 272 can work as the customer database section 114, page information storage section 116, on-air-list information storage section 117, now-on-air information storage section 119 and authentication information storage section 120 of the radio broadcast information delivery server SV3

(FIG. 7). By the way, the radio broadcast information delivery server SV3 illustrated by FIG. 7 includes functional circuit blocks.

In this manner, if the programs stored in the ROM 271 or the hard disk drive 272 are selected properly, the server including hardware circuit blocks can provide the same functions as the portal server 3, music data delivery server SV1, product sales server SV2, and radio broadcast information delivery server SV3 including functional circuit blocks as illustrated by FIG. 4 through FIG. 7.

In the above-noted embodiments, the client terminal 2 receives radio broadcasts from radio stations. However, the present invention is not limited to this. For example, the client terminal 2 can receive television broadcasts from television stations, and acquire various kinds of broadcast information relating to television programs from servers on the network NT.

In the above-noted embodiments, the client terminal 2 is equipped with the hardware circuit blocks, the functional circuit blocks, and the program modules. However, the present invention is not limited to this. For example, other terminals such as mobile phones and personal computers also can be equipped with the hardware circuit blocks, the functional circuit blocks, and the program modules. The terminals including the hardware circuit blocks, the functional circuit blocks, and the program modules can perform the same processes as the above-mentioned client terminal 2.

(2) Horizontal-to-Vertical Ratio Adjustment Process During Download of Music Data In the music related service provision system 1 shown in FIG. 1, for example, when a user performs a download operation to download music data, the client terminal 2 requests the music data from the music data delivery server SV1. At this time, the music data delivery server SV1 reads out, in response to the request, the music data from the hard disk drive 272, and then transmits the music data to the client terminal 2.

By the way, the music data, which is downloaded from the music data delivery server SV1 to the client terminal 2, may include image data representing a portrait of an artist who plays the music (i.e. this image data is equivalent to a jacket photograph inserted into a music CD, and therefore this image data will be also referred to as a "jacket photograph image data").

Figure 17:
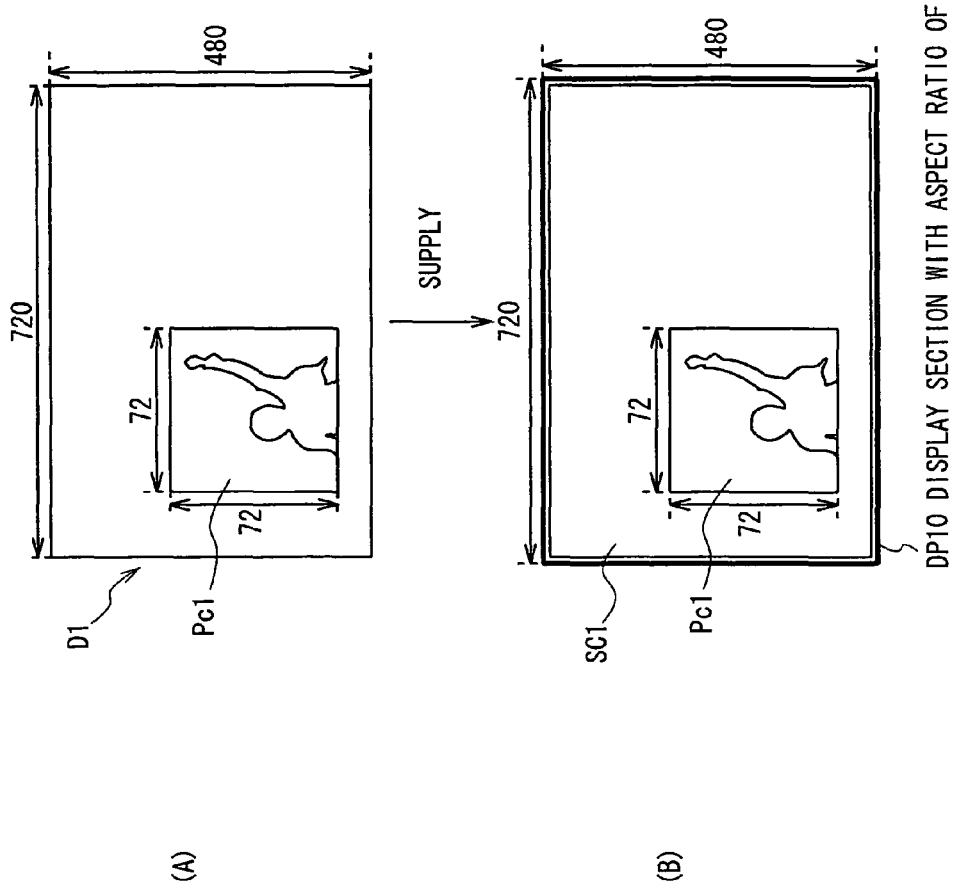
FIG. 17 is a schematic diagram illustrating jacket photograph image data.

As shown in FIG. 17A, a jacket photograph image Pc1, which is displayed based on the jacket photograph image data D1, shows the artist's portrait and the like. Therefore, in terms of copyright, the horizontal to vertical ratio of the jacket photograph image Pc1 should be kept in line with intentions of a creator who creates the image data.

In the present embodiment, the creator has generated the jacket photograph image data D1, which is supplied from the music data delivery server SV1 as a part of the music data, to be displayed on a display section with aspect ratio of 3:2. Accordingly, if the jacket photograph image data D1 is displayed on a display section DP10 with aspect ratio of 3:2 (720×480 pixels) as shown in FIG. 17B, the jacket photograph image Pc1 is displayed in a horizontal-to-vertical ratio of 1:1 (i.e. horizontal and vertical size: 72×72) which meets the creator's intention.

When the client terminal 2, which includes the display 206 capable of displaying an image in aspect ratio of 8:6 (640× 480 pixels), receives the music data from the music data delivery server SV1, the client terminal 2 checks whether or not the music data contains the image data.

When the client terminal 2 recognizes a fact that the music data contains the image data as a result of the check, the client terminal 2 recognizes that the image data is the jacket photograph image data D1 to be displayed in aspect ratio of 3:2 because the image data is included in the music data supplied from the music data delivery server SV1.

Figure 18:
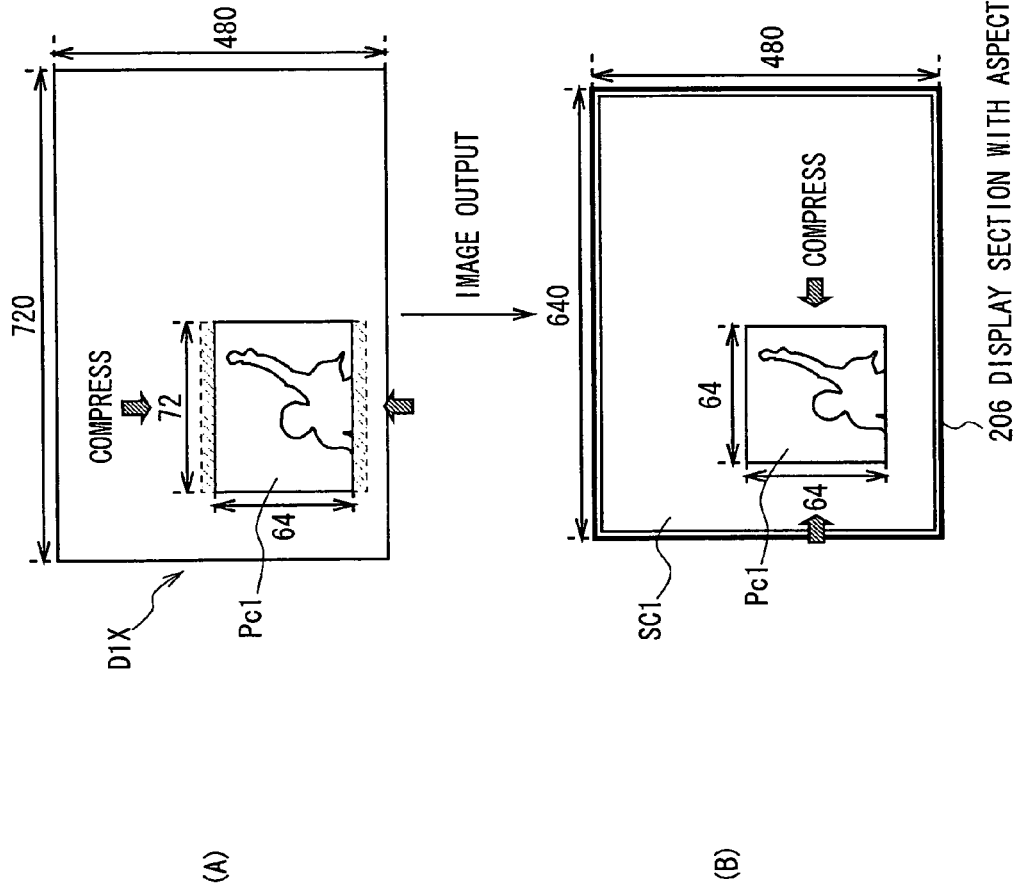
FIG. 18 is a schematic diagram illustrating a horizontal-to-vertical ratio adjustment process.

In response to that, the client terminal 2 for example temporarily stores the jacket photograph image data D1 in the RAM 205, and then performs a horizontal-to-vertical ratio adjustment process to compress the jacket photograph image Pc1 of the jacket photograph image data D1 in vertical direction. This creates jacket photograph image data (also referred to as horizontal-to-vertical-ratio-adjusted jacket photograph image data) D1X whose horizontal to vertical ratio of the jacket photograph image Pc1 has been changed from 72×72 (horizontal and vertical size) to 72×64 (horizontal and vertical size) as shown in FIG. 18A.

By the way, in the present embodiment, the client terminal 2 also performs a process to fill a blank space (indicated by hatching in FIG. 18), which was generated by compressing the jacket photograph image Pc1 in vertical direction, with some sort of color or the same color as the surrounding area.

The client terminal 2 subsequently stores the horizontal-to-vertical-ratio-adjusted jacket photograph image data D1X in the hard disk drive 211.

After that, for example, when a user performs an operation through the operation input section 200 to display the jacket photograph image Pc1 on the display 206 of the client terminal 2, the client terminal 2 reads out the horizontal-to-vertical-ratio-adjusted jacket photograph image data D1X from the hard-disk drive 211, and then displays, based on the horizontal-to-vertical-ratio-adjusted jacket photograph image data D1X, the jacket photograph image Pc1 on the display 206.

At this time, as shown in FIG. 18B, the client terminal 2 displays the whole screen SC1 including the jacket photograph image Pc1 within the display 206 with aspect ratio of 8:6 (640×480 pixels). Therefore, the jacket photograph image Pc1 on the screen SC1 is compressed in horizontal direction in ratio of 640/720.

As a result, the jacket photograph image Pc1 displayed on the display 206 of the client terminal 2 has a horizontal to vertical ratio of 1:1 (i.e. horizontal and vertical size: 64×64). This is the same as the one displayed on the display section DP10 with aspect ratio of 3:2 (720×480 pixels) which displays the image in a horizontal to vertical ratio of 1:1 (i.e. horizontal and vertical size: 72×72).

As described above, the client terminal 2 recognizes the image data, which is supplied from the music data delivery server SV1 as a part of the music data, as the jacket photograph image data D1 whose horizontal to vertical ratio should be kept. The client terminal 2 then performs a horizontal-to-vertical ratio adjustment process only to the jacket photograph image data D1 recognized.

Therefore, when the client terminal 2 downloads from the music data delivery server SV1 not only the music data including the jacket photograph image data D1 but also other image data whose horizontal to vertical ratio are allowed to change, the client terminal 2 does not recognize the other image data as the one whose horizontal to vertical ratio should be kept because the other image data are not included in the music data. Accordingly, the client terminal 2 does not perform a horizontal-to-vertical ratio adjustment process to the other image data.

In this manner, the client terminal 2 can perform a horizontal-to-vertical ratio adjustment process only to the jacket photograph image data D1 whose horizontal to vertical ratio should be kept in terms of copyright. This improves the processing efficiency of the client terminal 2.

With reference to a sequence chart shown in FIG. 19, a processing procedure RT1 will be described in detail. In the processing procedure RT1, the jacket photograph image data D1 in the music data supplied from the music data delivery server SV1 is stored in the hard disk drive 211 of the client terminal 2.

Figure 19:
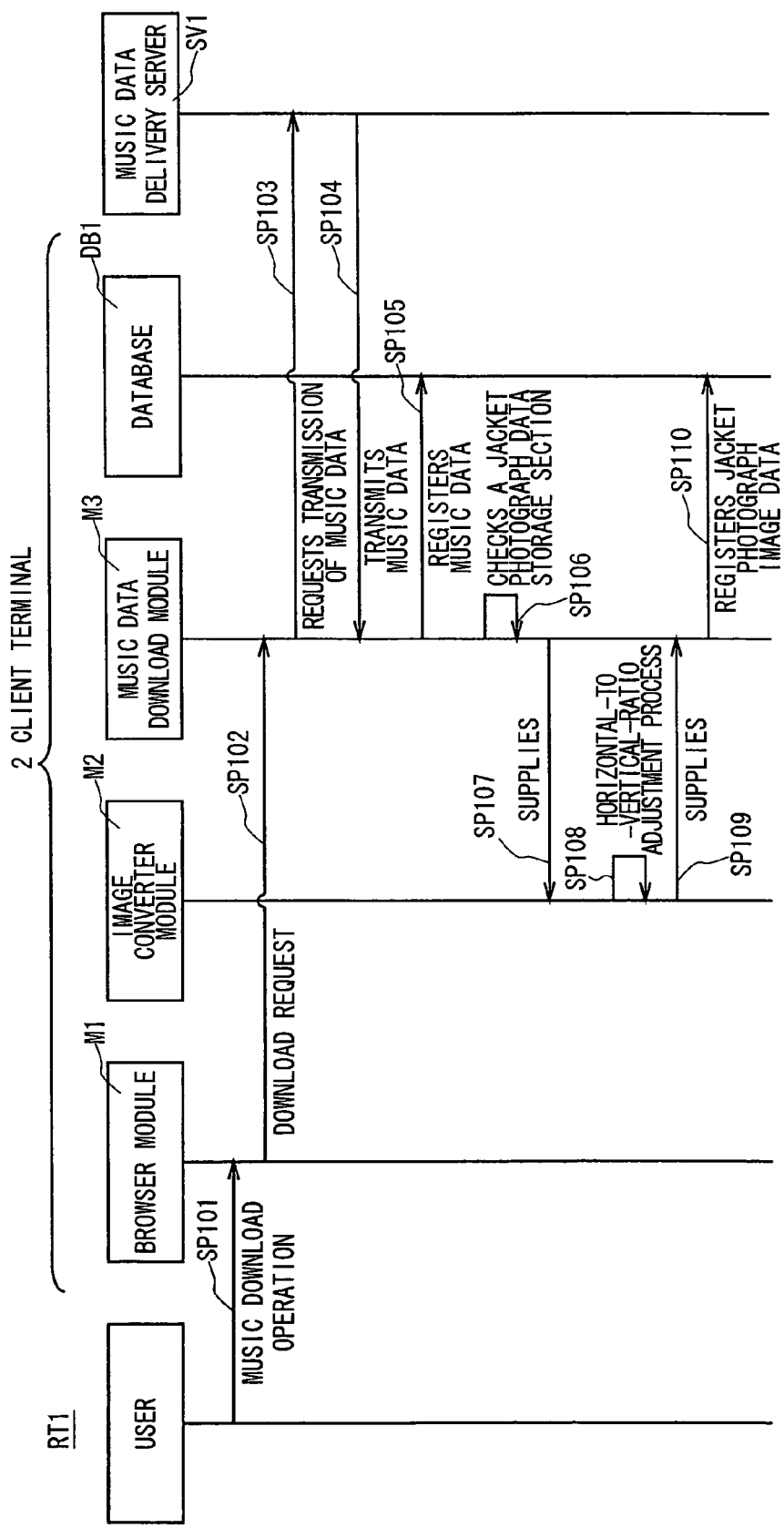
FIG. 19 is a sequence chart illustrating a jacket photograph image registration process.

By the way, a browser module M1 shown in FIG. 19 has a capability to display various web pages related to the music related service provision system 1, and is equivalent to the XML browser module 246 and the like shown in FIG. 15. An image converter module M2 has a capability to perform a horizontal-to-vertical ratio adjustment process, and is included in the XML browser module 246 shown in FIG. 15. A music data-download module M3 has a capability to download music data from the music data delivery server SV1, and is equivalent to the music purchase/playback module 245 and the like shown in FIG. 15. In addition, a database DB1 is installed in the hard disk drive 211 of the client terminal 2, and capable of storing music data downloaded from the music data delivery server SV1.

Figure 21:
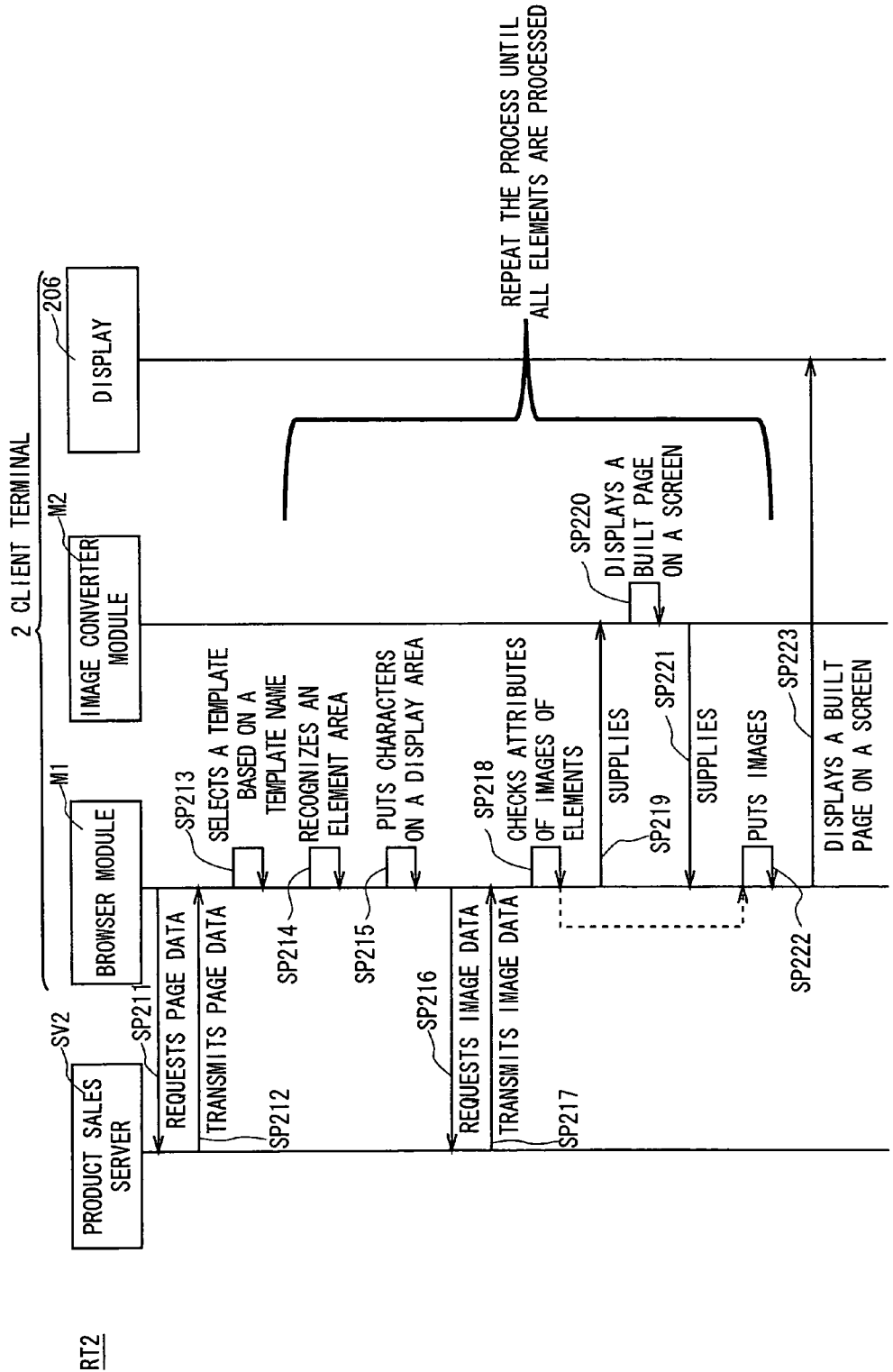
FIG. 21 is a sequence chart illustrating an advertising web page display process.
Figure 22:
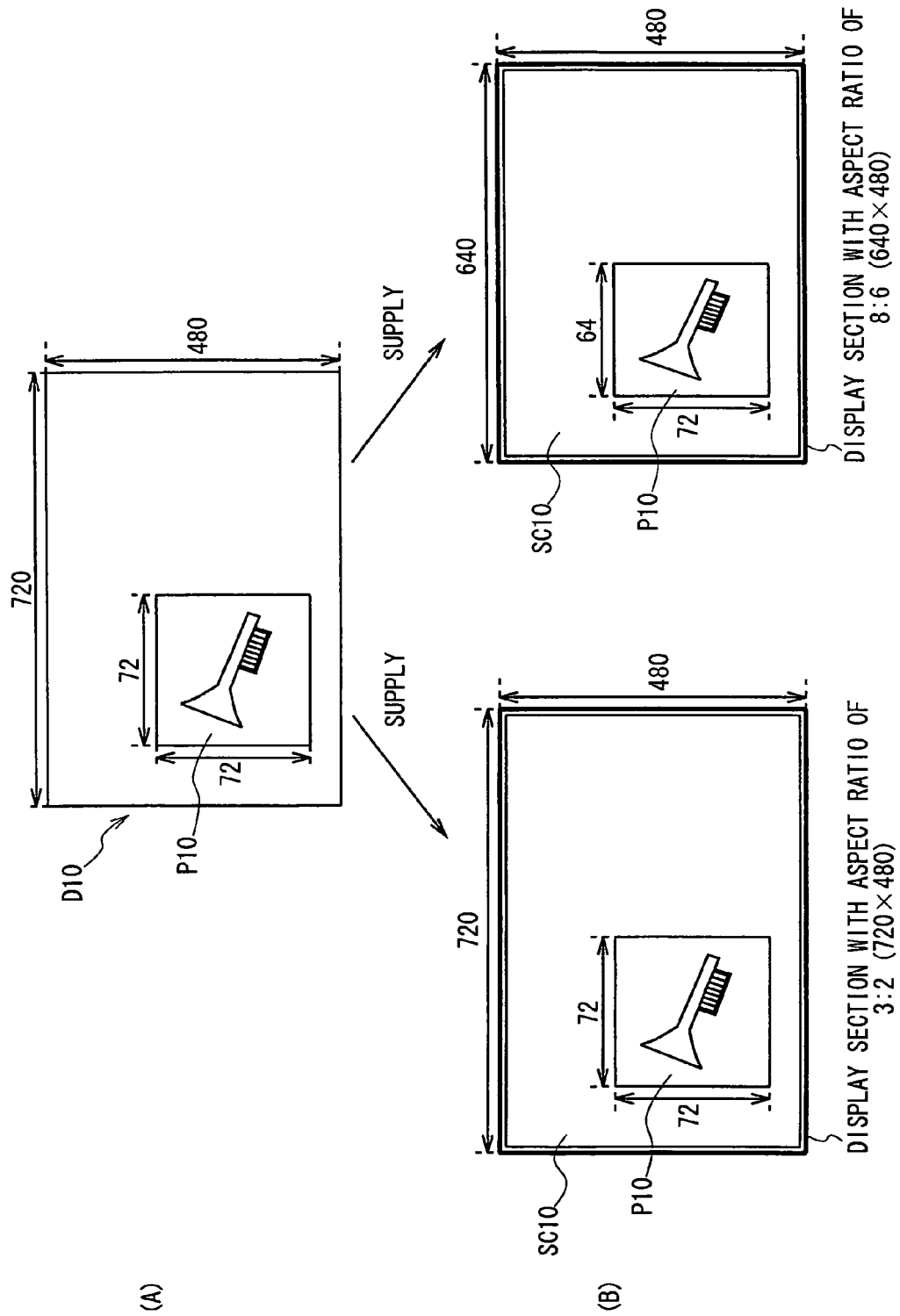
FIG. 22 is a schematic diagram showing a conventional example.

In the sequence charts shown in FIG. 19 and FIG. 21, the modules M1 to M3 will be described subjectively. However, the fact of the matter is that the CPU 203 of the client terminal 2 controls these modules M1 to M3 to perform processes.

For example, at step SP101, when a user performs an operation to download music data through a web page for music data download displayed on the display 206 of the client terminal 2, the browser module M1 of the client terminal 2 proceeds to step SP102, and then transmits to the music data download module M3 a download request signal requesting download of the music data.

When the music data download module M3 of the client terminal 2 receives the download request signal from the browser module M1, the music data download module M3 proceeds to step SP103, and then transmits to the music data delivery server SV1 a music data transmission request signal which directs the music data delivery server SV1 to transmit the music data corresponding to the download request signal.

When the CPU 270 of the music data delivery server SV1 receives the music data transmission request signal from the client terminal 2, the CPU 270 of the music data delivery server SV1 proceeds to step SP104. At step SP104, the CPU 270 of the music data delivery server SV1 reads out the music data corresponding to the music data transmission request signal from the hard disk drive 272, and then transmits the music data to the client terminal 2.

In this manner, the music data is downloaded from the music data delivery server SV1 to the client terminal 2.

In the present embodiment, the music data downloaded from the music data delivery server SV1 to the client terminal 2 is in a predetermined format, including a jacket photograph image data storage section where the jacket photograph image data D1 is stored.

When the music data download module M3 of the client terminal 2 receives the music data from the music data delivery server SV1, the music data download module M3 of the client terminal 2 proceeds to step SP105, and then registers (stores) the received music data in the database DB1.

The music data download module M3 of the client terminal 2 subsequently proceeds to step SP106, and then checks whether or not the jacket photograph image data storage section of the music data registered in the database DB1 contains image data.

When the music data download module M3 of the client terminal 2 recognizes a fact that the jacket photograph image data storage section contains image data as a result of the check, the music data download module M3 of the client terminal 2 recognizes the image data as the jacket photograph image data D1 that should be displayed in aspect ratio of 3:2, because this image data has been included in the jacket photograph image data storage section of the music data supplied from the music data delivery server SV1.

In response to that, the music data download module M3 of the client terminal 2 proceeds to step SP107. At step SP107, the music data download module M3 of the client terminal 2 retrieves the jacket photograph image data D1 from the jacket photograph image data storage section of the music data, and then supplies the jacket photograph image data D1 to the image converter module M2.

The image converter module M2 of the client terminal 2 proceeds to step SP108, and then performs a horizontal-to-vertical ratio adjustment process to the jacket photograph image data D1 supplied from the music data download module M3. This changes the horizontal to vertical ratio of the jacket photograph image Pc1 from "horizontal and vertical size: 72×72" to "horizontal and vertical size: 72×64" to generate a horizontal-to-vertical-ratio-adjusted jacket photograph image data D1X as shown in FIG. 18A.

The image converter module M2 of the client terminal 2 subsequently proceeds to step SP109, and then supplies the horizontal-to-vertical-ratio-adjusted jacket photograph image data D1X to the music data download module M3. At this time, the music data download module M3 proceeds to step SP110, and then registers the horizontal-to-vertical-ratio-adjusted jacket photograph image data D1X in the database DB1.

After that, for example, when a user performs, through the operation input section 200, an operation to display the jacket photograph image Pc1 on the display 206 of the client terminal 2, the CPU 203 of the client terminal 2 reads out the horizontal-to-vertical-ratio-adjusted jacket photograph image data D1X from the database DB1 and then displays, based on the horizontal-to-vertical-ratio-adjusted jacket photograph image data D1X, the jacket photograph image Pc1 on the display 206 in horizontal to vertical ratio of 1:1 (i.e. horizontal and vertical size: 64×64).

(3) Horizontal-to-Vertical Ratio Adjustment Process when Displaying Web Pages

In the music related service provision system 1 shown in FIG. 1, for example, the client terminal 2 acquires page data of a web page including an advertisement about music CDs from the product sales server SV2 (this web page will be also referred to as an advertising web page), and then displays, based on the page data acquired, the advertising web page on the display 206. In the present embodiment, the page data is described in XML and the like.

Figure 20:
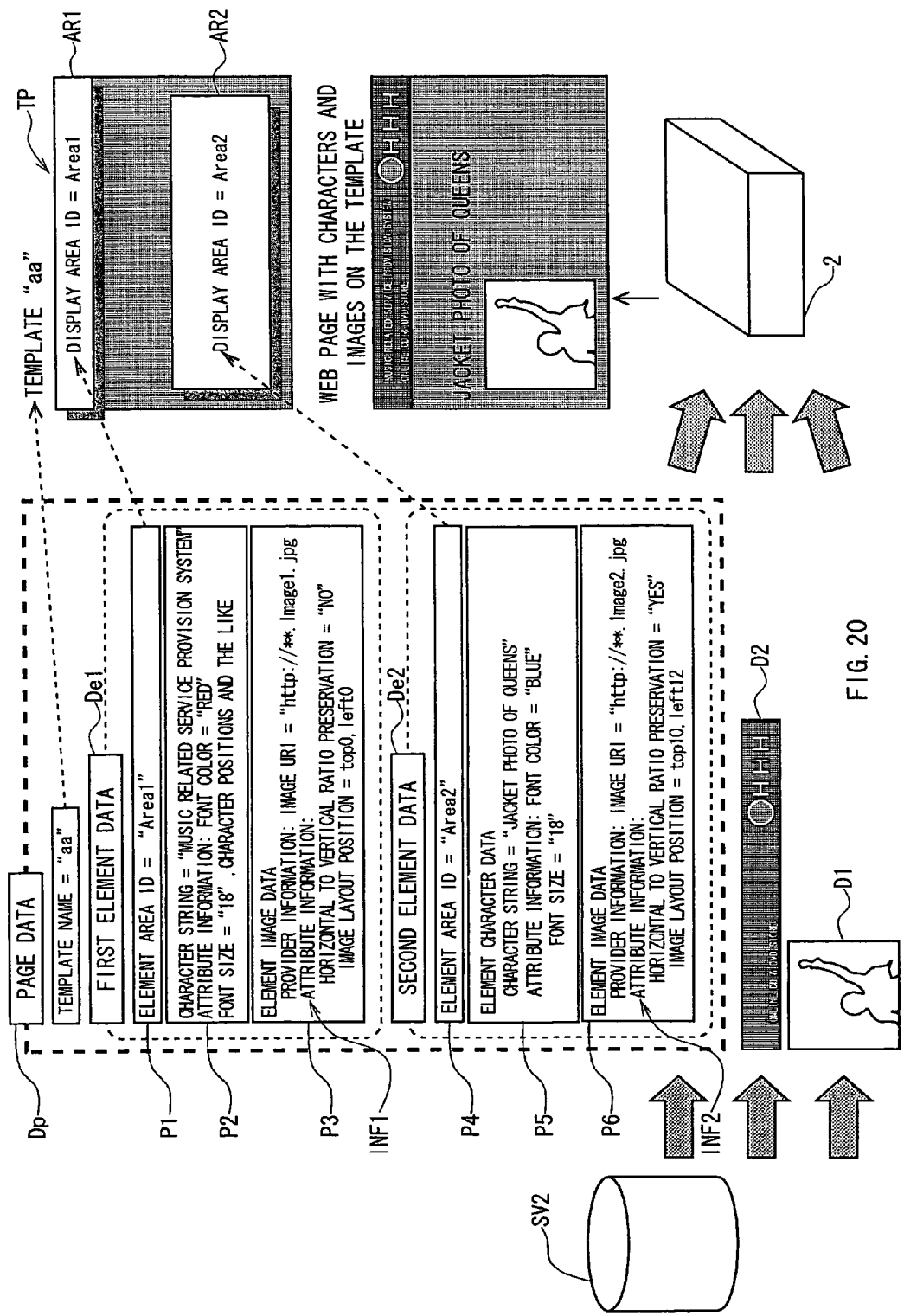
FIG. 20 is a schematic diagram showing a way of displaying a web page based on-page data.

Actually, as shown in FIG. 20, the page data Dp of the advertising web page acquired from the product sales server SV2 shows information of 'template name="aa"' which specifies a template to be used to display the advertising-web page.

Accordingly, to display the advertising web page, the client terminal 2, which has acquired the page data Dp, selects template data whose name is "aa" from among various template data previously stored in the hard disk drive 211.

In this case, as shown in FIG. 20, the template TP of the template data whose name is "aa" includes a first display area AR1, which is associated with a display area ID "Area1"; and a second display area AR2, which is associated with a display area ID "Area2".

The page data Dp of the advertising web page also contains first element data De1, which specifies the content to be displayed on the first display area AR1; and second element data De2, which specifies the content to be displayed on the second display area AR2.

The first element data De1 and the second element data De2 includes display area specifying sections P1 and P4, which specify a display area; character specifying sections P2 and P5, which specify characters to be displayed on the specified display area; and image specifying sections P3 and P6, which specify images to be displayed on the specified display area.

The display area specifying section P1 of the first element data De1 shows the display area ID "Area1" of the first display area AR1. Therefore, the client terminal 2 puts the characters specified by the character specifying section P2 of the first element data De1 and the images specified by the image specifying section P3 of the first element data De1 on the first display area AR1 of the template TP.

Specifically, the character specifying section P2 of the first element data De1 shows a character string of "Music related service provision system". The character specifying section P2 of the first element data De1 also shows attribute information such as a font size, font color and the like, which are to be used to display the character string.

Accordingly, the client terminal 2 puts, based on the description in the character specifying section P2, the character string of "Music related service provision system" on the first display area AR1.

The image specifying section P3 of the first element data De1 shows image data provider information indicative of a provider of the image data to be displayed (in this case, the image data provider information is URI (Uniform Resource Identifier)). The image specifying section P3 of the first element data De1 also shows attribute information INF1 such as information of 'horizontal to vertical ratio preservation="NO"', a display location of the image and the like. The information of 'horizontal to vertical ratio preservation="NO"' means that the horizontal to vertical ratio of the image is allowed to change when this image is displayed based on the image data.

Therefore, the client terminal 2 acquires, based on the description in the image specifying section P3, the image data D2 from the product sales server SV2 corresponding to the URI. The client terminal 2 does not perform a horizontal-to-vertical ratio adjustment process to the acquired image data D2, and then puts the image of the image data D2 on the first display area AR1.

In this way, if the attribute information INF1 corresponding to the image data D2 shows a fact that the horizontal to vertical ratio of the image is allowed to change, the client terminal 2 does not perform a horizontal-to-vertical ratio adjustment process to the image data D2.

On the other hand, the display area specifying section P4 of the second element data De2 shows the display area ID "Area2" of the second display area AR2. Therefore, the client terminal 2 puts the characters specified by the character specifying section P5 of the second element data De2 and the images specified by the image specifying section P6 of the second element data De2 on the second display area AR2 of the template TP.

Specifically, the character specifying section P5 of the second element data De2 shows a character string of "Jacket photo of Queens". The character specifying section P5 of the second element data De2 also shows attribute information such as a font size, font color and the like, which are to be used to display the character string.

Accordingly, the client terminal 2 puts, based on the description in the character specifying section P5, the character string of "Jacket photo of Queens" on the second display area AR2.

The image specifying section P6 of the second element data De2 shows image data provider information indicative of a provider of the image data (i.e. the jacket photograph image data D1) to be, displayed (in this case, the image data provider information is URI). The image specifying section P6 of the second element data De2 also shows attribute information INF2 such as information of 'horizontal to vertical ratio preservation="YES"', a display location of the jacket photograph image and the like. The information of 'horizontal to vertical ratio preservation="YES"' means that the horizontal to vertical ratio of the jacket photograph image should be kept when this jacket photograph image is displayed based on the jacket photograph image data D1.

Therefore, the client terminal 2 acquires, based on the description in the image specifying section P6, the jacket photograph image data D1 from the product sales server SV2 corresponding to the URI. The client terminal 2 subsequently performs a horizontal-to-vertical ratio adjustment process to the acquired jacket photograph image data D1 to generate the horizontal-to-vertical-ratio-adjusted jacket photograph image data D1X, and then puts the image of the horizontal-to-vertical-ratio-adjusted jacket photograph image data D1X on the second display area AR2.

In this way, if the attribute information INF2 corresponding to the jacket photograph image data D1 shows a fact that the horizontal to vertical ratio of the image should be kept, the client terminal 2 performs a horizontal-to-vertical ratio adjustment process to the jacket photograph image data D1.

After that, the client terminal 2 displays the advertising web page, which is made up of the character string of "Music related service provision system", the image of the image data D2, the character string of "Jacket photo of Queens", the jacket photograph image of the horizontal-to-vertical-ratio-adjusted jacket photograph image data D1X and the like, on the display 206 with aspect ratio of 8:6.

At this time, the jacket photograph image is displayed on the display 206 based on the horizontal-to-vertical-ratio-adjusted jacket photograph image data D1X. Therefore, the jacket photograph image is kept in horizontal to vertical ratio of 1:1 in line with the image data creator's intention. This prevents problems of copyright.

As described above, the client terminal 2 does not perform a horizontal-to-vertical ratio adjustment process to the image data D2 because the corresponding attribute information INF1 indicates that the horizontal to vertical ratio of the image is allowed to change. The client terminal 2 performs a horizontal-to-vertical ratio adjustment process to the jacket photograph image data D1 because the corresponding attribute information INF2 indicates that the horizontal to vertical ratio of the image should be kept. This improves the processing efficiency of the client terminal 2.

With reference to a sequence chart shown in FIG. 21, a processing procedure RT2 will be described in detail. In the processing procedure RT2, based on the page data Dp supplied from the product sales server SV2, the client terminal 2 displays the advertising web page on the display 206.

For example, when a user performs, through the operation input section 200, an operation to display an advertising web page, the browser module M1 of the client terminal 2 proceeds to step SP211, and then transmits a page data request signal to the product sales server SV2 to request the page data Dp of the advertising web page.

When the CPU 270 of the product sales server SV2 receives the page data request signal from the client terminal 2, the CPU 270 of the product sales server SV2 proceeds to step SP212. At step SP212, the CPU 270 of the product sales server SV2 reads out the page data Dp of the advertising web page from the hard disk drive 272, and then transmits the page data Dp to the client terminal 2.

When the browser module M1 of the client terminal 2 receives the page data Dp of the advertising web page from the product sales server SV2, the browser module M1 of the client terminal 2 proceeds to step SP213, and then selects, based on the page data Dp received, the template data whose name is "aa" from among various template data previously stored in the hard disk drive 211. As mentioned above, the template TP of the selected template data includes the first display area AR1 and the second display area AR2.

The browser module M1 of the client terminal 2 subsequently proceeds to step SP214, and then checks the first element data De1 in the page data Dp. Based on the description in the display area specifying section P1 of the first element data De1, the browser module M1 of the client terminal 2 recognizes a fact that the first display area AR1 has been specified.

The browser module M1 of the client terminal 2 subsequently proceeds to step SP215, and then puts, based on the character specifying section P2 of the first element data De1, the character string of "Music related service provision system" on the first display area AR1 which was recognized at step SP214.

The browser module M1 of the client terminal 2 subsequently proceeds to step SP216, and then transmits, based on the description in the image specifying section P3 of the first element data De1, an image data request signal to the product sales server SV2 to direct the product sales server SV2 to transmit the image data D2.

When the CPU 270 of the product sales server SV2 receives the image data request signal from the client terminal 2, the CPU 270 of the product sales server SV2 proceeds to step SP217. At step SP217, the CPU 270 of the product sales server SV2 reads out the image data D2 from the hard disk drive 272, and then transmits the image data D2 to the client terminal 2.

When the browser module M1 of the client terminal 2 receives the image data D2 from the product sales server SV2, the browser module M1 of the client terminal 2 proceeds to step SP218, and then recognizes, by checking the attribute information INF1 corresponding to the image data D2, a fact that the horizontal to vertical ratio of the image data D2 is allowed to change.

The browser module M1 of the client terminal 2 therefore does not perform a horizontal-to-vertical ratio adjustment process by skipping step SP219 to SP21, and then proceeds to step SP222. At step SP222, the browser module M1 of the client terminal 2 puts the image of the image data D2 on the first display area AR1 which was recognized at step SP214.

In this case, besides the first element data De1, there is the second element data De2 in the page data Dp acquired from the product sales server SV2. The browser module M1 of the client terminal 2 therefore returns to step SP214 described above.

At second step SP214, the browser module M1 of the client terminal 2 checks the second element data De2 in the page data Dp. Based on the description in the display area specifying section P4 of the second element data De2, the browser module M1 of the client terminal 2 recognizes a fact that the second display area AR2 has been specified.

The browser module M1 of the client terminal 2 subsequently proceeds to step SP215, and then puts, based on the character specifying section P5 of the second element data De2, the character string of "Jacket photo of Queens" on the second display area AR2 which was recognized at second step SP214.

The browser module M1 of the client terminal 2 subsequently proceeds to step SP216, and then transmits, based on the description in the image specifying section P6 of the second element data De2, an image data request signal to the product sales server SV2 to direct the product sales server SV2 to transmit the jacket photograph image data D1.

When the CPU 270 of the product sales server SV2 receives the image data request signal from the client terminal 2, the CPU 270 of the product sales server SV2 proceeds to step SP217. At step SP217, the CPU 270 of the product sales server SV2 reads out the jacket photograph image data D1 from the hard disk drive 272, and then transmits the jacket photograph image data D1 to the client terminal 2.

When the browser module M1 of the client terminal 2 receives the jacket photograph image data D1 from the product sales server SV2, the browser module M1 of the client terminal 2 proceeds to step SP218, and then recognizes, by checking the attribute information INF2 corresponding to the jacket photograph image data D1, a fact that the horizontal to vertical ratio of the jacket photograph image data D1 should be kept.

Therefore, the browser module M1 of the client terminal 2 proceeds to step SP219, and then supplies the jacket photograph image data D1 to the image converter module M2. At this time, the image converter module M2 of the client terminal 2 proceeds to step SP220, and then performs a horizontal-to-vertical ratio adjustment process to the jacket photograph image data D1 supplied from the browser module M1 to generate the horizontal-to-vertical-ratio-adjusted jacket photograph image data D1X. Then, the image converter module M2 of the client terminal 2 at step SP221 supplies the horizontal-to-vertical-ratio-adjusted jacket photograph image data D1X to the browser module M1.

The browser module M1 of the client terminal 2 subsequently proceeds to step SP222, and then puts the jacket photograph image of the horizontal-to-vertical-ratio-adjusted jacket photograph image data D1X on the second display area AR2 which was recognized at second step SP214.

The browser module M1 of the client terminal 2 subsequently proceeds to step SP223, and then displays the advertising web page, which is made up of the character string of "Music related service provision system", the image of the image data D2, the character string of "Jacket photo of Queens", the jacket photograph image of the horizontal-to-vertical-ratio-adjusted jacket photograph image data D1X and the like, on the display 206 with aspect ratio of 8:6.

(4) Operation and Effect

The client terminal 2 with the above configuration recognizes the image data, which was supplied from the music data delivery server SV1 as a part of the music data, as the jacket photograph image data D1 whose horizontal to vertical ratio should be kept. The client terminal 2 then performs a horizontal-to-vertical ratio adjustment process only to the jacket photograph image data D1 recognized.

Accordingly, even if the client terminal 2 downloads from the music data delivery server SV1 not only the music data including the jacket photograph image data D1 but also other image data whose horizontal to vertical ratios are allowed to change, the client terminal 2 does not recognizes the other image data as the one whose horizontal to vertical ratio should be kept because the other image data have not been included in the music data. Therefore, the client terminal 2 does not perform a horizontal-to-vertical ratio adjustment process to the other image data.

Thus, the client terminal 2 performs a horizontal-to-vertical ratio adjustment process only to the jacket photograph image data D1 whose horizontal to vertical ratio should be kept in terms of copyright. This improves the processing efficiency of the client terminal 2.

In addition, when the client terminal 2 displays, based on the page data Dp acquired from the product sales server SV2, the advertising web page, the client terminal 2 does not perform a horizontal-to-vertical ratio adjustment process to the image data D2 because the corresponding attribute information INF1 indicates that the horizontal to vertical ratio of the image is allowed to change. The client terminal 2 performs a horizontal-to-vertical ratio adjustment process to the jacket photograph image data D1 because the corresponding attribute information INF2 indicates that the horizontal to vertical ratio of the image should be kept. This improves the processing efficiency of the client terminal 2.

In this manner, the client terminal 2 with the above configuration performs a horizontal-to-vertical ratio adjustment process only to the jacket photograph image data D1 whose horizontal to vertical ratio should be kept in terms of copyright. This improves the processing efficiency of the client terminal 2.

The summary of the present embodiment will be described with reference to FIG. 23. In this case, an example of the configuration of an image data processing device 1000, which corresponds to the client terminal 2, will be described.

For example, the image data processing device 1000 includes an attribute detection section 1001 that detects attribute of image data D1000 input from an external section (the music data delivery server SV1 or the product sales server SV2); and an image data processing section 1003 that processes, based on the attribute detected by the attribute detection section 1001 and in accordance with an aspect ratio of a display section 1002 where the image data D1000 is displayed, the image data D1000 such that a horizontal to vertical ratio of the image data D1000 is kept when the image data D1000 is displayed on the display section 1002.

Specifically, the image data processing device 1000 includes a communication section 1004 that receives content data including the image data D1000 from the external section. In this case, the attribute detection section 1001 detects whether or not the content data received by the communication section 1004 contains the image data D1000. When the attribute detection section 1001 detects that the image data D1000 is contained, the image data processing section 1003 processes the image data D1000 such that the horizontal to vertical ratio of the image data D1000 is kept when the image data D1000 is displayed on the display section 1002.

In addition, the communication section 1004 of the image data processing device 1000 receives, from the external section, page data (web pages and the like) as well as the image data D100. In this case, the attribute detection section 1001 detects, based on the page data received, the attribute of the image data D1000 which is to be displayed based on the page data. The image data processing section 1003 processes, based on the attribute detected by the attribute detection section 1001, the image data D1000 such that the horizontal to vertical ratio of the image data D1000 is kept when the image data D1000 is displayed on the display section 1002.

In addition, the attribute detection section 1001 detects, as the attribute detected, whether or not the image data D1000 is a copyrighted production. Specifically, the attribute detection section 1001 detects the image data D1000 representing a jacket photograph of an album equivalent to package media as a copyrighted production.

Figure 23:
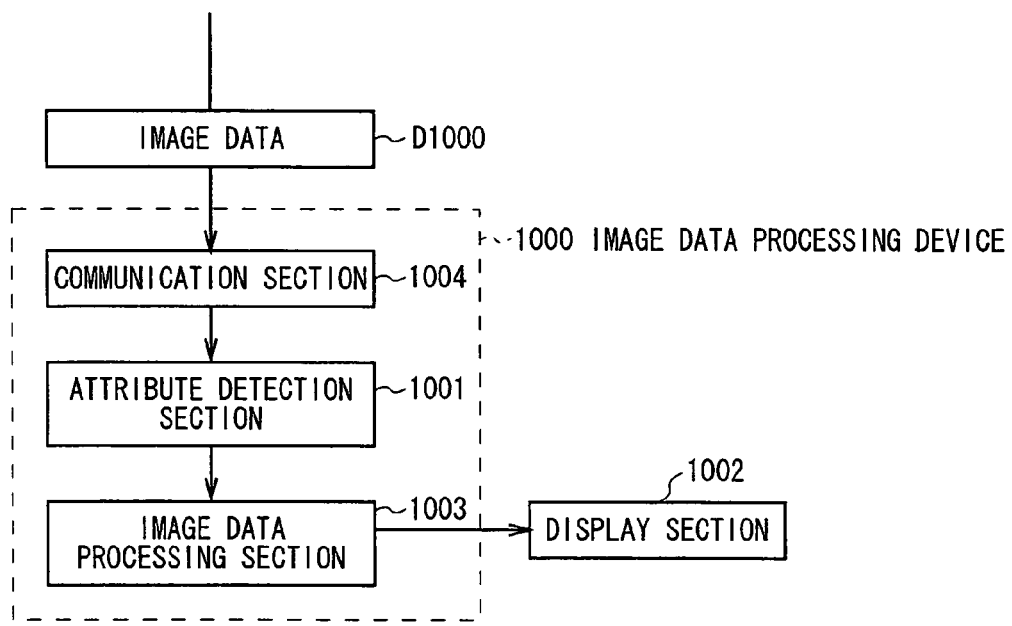
FIG. 23 is a schematic diagram showing the configuration of an image data processing device.

For example, in the present embodiment, the image data processing device 1000 shown in FIG. 23 is equivalent to the client terminal 2 shown in FIG. 2. The attribute detection section 1001 shown in FIG. 23 is for example equivalent to the control section 23 shown in FIG. 2. The display section 1002 shown in FIG. 23 is for example equivalent to the display section 25 shown in FIG. 2. The image data processing section 1003 shown in FIG. 23 is for example equivalent to the control section 23 shown in FIG. 2. The communication section 1004 shown in FIG. 23 is for example equivalent to the communication control section 32 and network interface 33 shown in FIG. 2.

(5) Other Embodiments

In the above-noted embodiments, the client terminal 2 having the display 206 is applied as an image data processing apparatus. However, the present invention is not limited to this. A video recorder which supplies image data to external display devices such as television, and other kinds of information processing devices can be applied.

In addition, in the above-noted embodiments, the modules M1 to M3 (equivalent to an image data processing program) of the client terminal 2 are applied as attribute detection means that detects attribute of image data input, and as image data processing means that processes the image data such that the horizontal to vertical ratio of the image data is kept. That is to say, the processing procedures RT1 and RT2 shown in FIGS. 19 and 21 are performed by software. However, the present invention is not limited to this. The client terminal 2 can be equipped with hardware by which the processing procedures RT1 and RT2 are executed.

Furthermore, in the above-noted embodiments, the jacket photograph image of an album, which is attached to package media (music CDs), is processed such that the horizontal to vertical ratio of the jacket photograph image is kept in terms of copyright. However, the present invention is not limited to this. This process may be performed to other kinds of images.

INDUSTRIAL APPLICABILITY

The present invention can be utilized for devices such as an image display device that displays an image based on image data supplied from outside.

DESCRIPTION OF SYMBOLS

1 . . . MUSIC RELATED SERVICE PROVISION SYSTEM, 2 . . . CLIENT TERMINAL, SV1 . . . MUSIC DATA DELIVERY SERVER, SV2 . . . PRODUCT SALES SERVER, 203, 207 . . . CPU, 214 . . . COMMUNICATION PROCESSING SECTION, 215, 275 . . . NETWORK INTERFACE

The invention claimed is:
1. An image data processing apparatus, comprising:
a processing unit configured to
detect an attribute of image data input; and
a network interface that receives content data from an external section, wherein, upon said processing unit detecting that said image data is contained in a predetermined location of said content data, said processing unit determines whether the image data is a copyrighted jacket photograph based on the attribute, and only when the processor determines that the image data is a copyrighted jacket photograph, compresses, based on said attribute detected and in accordance with an aspect ratio of a physical display device, said image data and performs a process to fill a blank space generated by compressing said image data to produce adjusted image data, and registers the adjusted image data in a database to keep a horizontal to vertical ratio of said image data when said adjusted image data is displayed on said physical display device.

2. The image data processing apparatus according to claim 1, wherein said network interface receives page data from an external section, and said processing unit is configured to detect, based on said page data received, the attribute of said image data, said image data to be displayed based on said page data.

3. The image data processing apparatus according to claim 1, wherein image data representing a jacket photograph of an album equivalent to package media is said copyrighted production.

4. An image data processing method implemented by an image data processing apparatus, the image data processing method comprising:

detecting an attribute of image data input;
receiving content data from an external section;
responsive to a detection that said image data is contained in a predetermined location of said content data, determining whether the image data is a copyrighted jacket photograph based on the attribute; and
only when the image data is a copyrighted jacket photograph,
compressing, with said image data processing apparatus, based on said attribute detected and in accordance with an aspect ratio of a physical display device, said image data,
performing a process to fill a blank space generated by compressing said image data to produce adjusted image data, and
registering the adjusted image data in a database to keep a horizontal to vertical ratio of said image data when said adjusted image data is displayed on said physical display device.

5. The image data processing method according to claim 4, further comprising:
receiving page data from an external section, wherein said detecting detects, based on said page data received, the attribute of said image data, said image data to be displayed based on said page data.

6. The image data processing method according to claim 4, wherein image data representing a jacket photograph of an album equivalent to package media is said copyrighted production.

7. A non-transitory computer-readable storage medium encoded with an image data processing program, the image data processing program, when executed by a computer, causing the computer to execute a method, comprising:

detecting an attribute of image data input;
receiving content data from an external section;
responsive to a detection that said image data is contained in a predetermined location of said content data, determining whether the image data is a copyrighted jacket photograph based on the attribute; and
only when the image data is a copyrighted jacket photograph,
compressing, based on said attribute detected and in accordance with an aspect ratio of a physical display device, said image data,
performing a process to fill a blank space generated by compressing said image data to produce adjusted image data, and
registering the adjusted image data in a database to keep a horizontal to vertical ratio of said image data when said adjusted image data is displayed on said physical display device.

8. The image data processing apparatus according to claim 1, wherein the processing unit reads out said adjusted image data from said database, upon an operation on an input section.

9. The image data processing apparatus according to claim 1, wherein said processing unit processes, in accordance with the horizontal to vertical ratio of said image data, said image data to produce the adjusted image data.

10. The image data processing apparatus according to claim 1, wherein said processing unit compresses, in accordance with the aspect ratio of the display section and the horizontal to vertical ratio of said image data, said image data in a horizontal direction or a vertical direction to produce the adjusted image data.

11. The image data processing apparatus according to claim 1, wherein said content data is music data.

* * * * *